US008923138B2

(12) United States Patent
Miyazaki et al.

(10) Patent No.: US 8,923,138 B2
(45) Date of Patent: Dec. 30, 2014

(54) PACKET RELAY DEVICE, PACKET RELAY SYSTEM, AND FAULT DETECTION METHOD

(75) Inventors: Takashi Miyazaki, Ayase (JP); Kengo Miyajima, Ayase (JP); Hideo Kodaka, Ebina (JP)

(73) Assignee: Alaxala Networks Corporation, Kawasaki-Shi, Kanagawa (JP)

( * ) Notice: Subject to any disclaimer, the term of this patent is extended or adjusted under 35 U.S.C. 154(b) by 150 days.

(21) Appl. No.: 13/606,568

(22) Filed: Sep. 7, 2012

(65) Prior Publication Data

US 2013/0242756 A1 Sep. 19, 2013

(30) Foreign Application Priority Data

Nov. 29, 2011 (JP) .................................. 2011-259791

(51) Int. Cl.
*H04L 12/26* (2006.01)
*H04L 12/24* (2006.01)

(52) U.S. Cl.
CPC ........ *H04L 43/0817* (2013.01); *H04L 41/0677* (2013.01); *H04L 43/0847* (2013.01)
USPC ........... 370/244; 370/242; 370/250; 709/224; 714/10; 714/48

(58) Field of Classification Search
None
See application file for complete search history.

(56) References Cited

U.S. PATENT DOCUMENTS

| | | | |
|---|---|---|---|
| 6,711,134 B1 * | 3/2004 | Wichelman et al. .......... | 370/241 |
| 7,099,942 B1 * | 8/2006 | Wilson et al. ................. | 709/224 |
| 7,369,509 B2 * | 5/2008 | Lapeyre et al. ............... | 370/252 |
| 7,961,638 B2 * | 6/2011 | Porat ............................. | 370/252 |
| 2003/0043755 A1 * | 3/2003 | Mitchell ....................... | 370/252 |
| 2006/0007991 A1 * | 1/2006 | Wang et al. ................... | 375/224 |
| 2007/0258382 A1 * | 11/2007 | Foll et al. ..................... | 370/252 |

FOREIGN PATENT DOCUMENTS

| | | |
|---|---|---|
| JP | 09-181735 A1 | 7/1997 |
| JP | 2006-229477 A | 8/2006 |
| JP | 2011-151470 A | 8/2011 |

OTHER PUBLICATIONS

Japanese Office Action, Japanese Patent Appln. No. 2011-259791, Oct. 21, 2014, 3 pp.

* cited by examiner

*Primary Examiner* — Donald Mills
(74) *Attorney, Agent, or Firm* — Volpe and Koenig, P.C.

(57) ABSTRACT

A fault that cannot be autonomously detected by all or a specific software module and all or a specific hardware device which realize the packet transmitting/receiving function is detected, and also a fault part is specified. A packet relay device realizes the packet transmitting and receiving functions through plural software modules and plural hardware devices. The packet relay device includes a memory space 105, reception statistics 131, 133, 135, and transmission statistics 132, 134, 136, and collects pass information of fault monitoring packets in all or the specific software module and all of the hardware devices whose operation is to be confirmed by the fault monitoring packets for detecting the faults within the device. A fault part specifying unit 118 is provided for specifying the fault part according to the pass information of the fault monitoring packet when abnormality is detected.

15 Claims, 15 Drawing Sheets

| DETERMINATION SEQUENCE | DETERMINATION CONTENTS | FAULT PART |
|---|---|---|
| 1 | [MEMORY SPACE, HEALTH CHECK START UNIT, TRANSMISSION STATISTICS]<br>≠ [MEMORY SPACE, PACKET TRANSMISSION START UNIT, RECEPTION STATISTICS] | SOFTWARE,<br>PACKET TRANSMISSION START UNIT |
| 2 | [MEMORY SPACE, PACKET TRANSMISSION START UNIT, RECEPTION STATISTICS]<br>≠ [MEMORY SPACE, PACKET TRANSMISSION START UNIT, TRANSMISSION STATISTICS] | SOFTWARE,<br>PACKET TRANSMISSION START UNIT |
| 3 | [MEMORY SPACE, PACKET TRANSMISSION START UNIT, TRANSMISSION STATISTICS]<br>≠ [PACKET TRANSMITTING UNIT, RECEPTION STATISTICS] | HARDWARE,<br>PACKET TRANSMITTING UNIT |
| 4 | [PACKET TRANSMITTING UNIT, RECEPTION STATISTICS]<br>≠ [PACKET TRANSMITTING UNIT, TRANSMISSION STATISTICS] | HARDWARE,<br>PACKET TRANSMITTING UNIT |
| 5 | [PACKET TRANSMITTING UNIT, TRANSMISSION STATISTICS]<br>≠ [DESTINATION DETERMINING UNIT, RECEPTION STATISTICS] | HARDWARE,<br>DESTINATION DETERMINING UNIT |
| 6 | [DESTINATION DETERMINING UNIT, RECEPTION STATISTICS.]<br>≠ [DESTINATION DETERMINING UNIT, TRANSMISSION STATISTICS] | HARDWARE,<br>DESTINATION DETERMINING UNIT |
| 7 | [DESTINATION DETERMINING UNIT, TRANSMISSION STATISTICS]<br>≠ [PACKET RECEIVING UNIT, RECEPTION STATISTICS] | HARDWARE,<br>PACKET RECEIVING UNIT |
| 8 | [PACKET RECEIVING UNIT, RECEPTION STATISTICS]<br>≠ [PACKET RECEIVING UNIT, TRANSMISSION STATISTICS] | HARDWARE,<br>PACKET RECEIVING UNIT |
| 9 | [PACKET TRANSMITTING UNIT, TRANSMISSION STATISTICS]<br>≠ [MEMORY SPACE, PACKET RECEIVING UNIT, RECEPTION STATISTICS] | SOFTWARE,<br>PACKET RECEIVING PROCESSOR |
| 10 | [MEMORY SPACE, PACKET RECEIVING UNIT, RECEPTION STATISTICS]<br>≠ [MEMORY SPACE, PACKET RECEIVING UNIT, TRANSMISSION STATISTICS] | SOFTWARE,<br>PACKET RECEIVING PROCESSOR |
| 11 | [MEMORY SPACE, PACKET RECEIVING UNIT, TRANSMISSION STATISTICS]<br>≠ [MEMORY SPACE, PACKET DETERMINING UNIT, RECEPTION STATISTICS] | SOFTWARE,<br>PACKET DETERMINING UNIT |
| 12 | [MEMORY SPACE, PACKET DETERMINING UNIT, RECEPTION STATISTICS]<br>≠ [MEMORY SPACE, PACKET DETERMINING UNIT, TRANSMISSION STATISTICS] | SOFTWARE,<br>PACKET DETERMINING UNIT |

FIG. 10

| DETERMINATION SEQUENCE | DETERMINATION CONTENTS | | FAULT PART |
|---|---|---|---|
| 1 | [MEMORY SPACE, HEALTH CHECK START UNIT, TRANSMISSION STATISTICS] ≠ [MEMORY SPACE, PACKET TRANSMISSION START UNIT, RECEPTION STATISTICS] | →INAPPROPRIATE | SOFTWARE, PACKET TRANSMISSION START UNIT |
| 2 | [MEMORY SPACE, PACKET TRANSMISSION START UNIT, RECEPTION STATISTICS] ≠ [MEMORY SPACE, PACKET TRANSMISSION START UNIT, TRANSMISSION STATISTICS] | →INAPPROPRIATE | SOFTWARE, PACKET TRANSMISSION START UNIT |
| 3 | [MEMORY SPACE, PACKET TRANSMISSION START UNIT, TRANSMISSION STATISTICS] ≠ [PACKET TRANSMITTING UNIT, RECEPTION STATISTICS] | →INAPPROPRIATE | HARDWARE, PACKET TRANSMITTING UNIT |
| 4 | [PACKET TRANSMITTING UNIT, RECEPTION STATISTICS] ≠ [PACKET TRANSMITTING UNIT, TRANSMISSION STATISTICS] | →APPROPRIATE | HARDWARE, PACKET TRANSMITTING UNIT |
| 5 | [PACKET TRANSMITTING UNIT, TRANSMISSION STATISTICS] ≠ [DESTINATION DETERMINING UNIT, RECEPTION STATISTICS] | | HARDWARE, DESTINATION DETERMINING UNIT |
| 6 | [DESTINATION DETERMINING UNIT, RECEPTION STATISTICS] ≠ [DESTINATION DETERMINING UNIT, TRANSMISSION STATISTICS] | | HARDWARE, DESTINATION DETERMINING UNIT |
| 7 | [DESTINATION DETERMINING UNIT, TRANSMISSION STATISTICS] ≠ [PACKET RECEIVING UNIT, RECEPTION STATISTICS] | | HARDWARE, PACKET RECEIVING UNIT |
| 8 | [PACKET RECEIVING UNIT, RECEPTION STATISTICS] ≠ [PACKET RECEIVING UNIT, TRANSMISSION STATISTICS] | | HARDWARE, PACKET RECEIVING UNIT |
| 9 | [PACKET TRANSMITTING UNIT, TRANSMISSION STATISTICS] ≠ [MEMORY SPACE, PACKET RECEIVING UNIT, RECEPTION STATISTICS] | | SOFTWARE, PACKET RECEIVING PROCESSOR |
| 10 | [MEMORY SPACE, PACKET RECEIVING UNIT, RECEPTION STATISTICS] ≠ [MEMORY SPACE, PACKET RECEIVING UNIT, TRANSMISSION STATISTICS] | | SOFTWARE, PACKET RECEIVING PROCESSOR |
| 11 | [MEMORY SPACE, PACKET RECEIVING UNIT, TRANSMISSION STATISTICS] ≠ [MEMORY SPACE, PACKET DETERMINING UNIT, RECEPTION STATISTICS] | | SOFTWARE, PACKET DETERMINING UNIT |
| 12 | [MEMORY SPACE, PACKET DETERMINING UNIT, RECEPTION STATISTICS] ≠ [MEMORY SPACE, PACKET DETERMINING UNIT, TRANSMISSION STATISTICS] | | SOFTWARE, PACKET DETERMINING UNIT |

FIG. 11

| DETERMINATION SEQUENCE | DETERMINATION CONTENTS | | FAULT PART |
|---|---|---|---|
| 1 | [MEMORY SPACE, HEALTH CHECK START UNIT, TRANSMISSION STATISTICS]<br>≠ [MEMORY SPACE, PACKET TRANSMISSION START UNIT, RECEPTION STATISTICS] | →INAPPROPRIATE | SOFTWARE,<br>PACKET TRANSMISSION START UNIT |
| 2 | [MEMORY SPACE, PACKET TRANSMISSION START UNIT, RECEPTION STATISTICS]<br>≠ [MEMORY SPACE, PACKET TRANSMISSION START UNIT, TRANSMISSION STATISTICS] | →INAPPROPRIATE | SOFTWARE,<br>PACKET TRANSMISSION START UNIT |
| 3 | [MEMORY SPACE, PACKET TRANSMISSION START UNIT, TRANSMISSION STATISTICS]<br>≠ [PACKET TRANSMITTING UNIT, RECEPTION STATISTICS] | →INAPPROPRIATE | HARDWARE,<br>PACKET TRANSMITTING UNIT |
| 4 | [PACKET TRANSMITTING UNIT, RECEPTION STATISTICS]<br>≠ [PACKET TRANSMITTING UNIT, TRANSMISSION STATISTICS] | →INAPPROPRIATE | HARDWARE,<br>PACKET TRANSMITTING UNIT |
| 5 | [PACKET TRANSMITTING UNIT, TRANSMISSION STATISTICS]<br>≠ [DESTINATION DETERMINING UNIT, RECEPTION STATISTICS] | →INAPPROPRIATE | HARDWARE,<br>DESTINATION DETERMINING UNIT |
| 6 | [DESTINATION DETERMINING UNIT, RECEPTION STATISTICS,]<br>≠ [DESTINATION DETERMINING UNIT, TRANSMISSION STATISTICS] | →INAPPROPRIATE | HARDWARE,<br>DESTINATION DETERMINING UNIT |
| 7 | [DESTINATION DETERMINING UNIT, TRANSMISSION STATISTICS]<br>≠ [PACKET RECEIVING UNIT, RECEPTION STATISTICS] | →INAPPROPRIATE | HARDWARE,<br>PACKET RECEIVING UNIT |
| 8 | [PACKET RECEIVING UNIT, RECEPTION STATISTICS]<br>≠ [PACKET RECEIVING UNIT, TRANSMISSION STATISTICS] | →INAPPROPRIATE | HARDWARE,<br>PACKET RECEIVING UNIT |
| ⑨ | [PACKET TRANSMITTING UNIT, TRANSMISSION STATISTICS]<br>≠ [MEMORY SPACE, PACKET RECEIVING UNIT, RECEPTION STATISTICS] | →APPROPRIATE | SOFTWARE,<br>PACKET RECEIVING PROCESSOR |
| 10 | [MEMORY SPACE, PACKET RECEIVING UNIT, RECEPTION STATISTICS]<br>≠ [MEMORY SPACE, PACKET RECEIVING UNIT, TRANSMISSION STATISTICS] | | SOFTWARE,<br>PACKET RECEIVING PROCESSOR |
| 11 | [MEMORY SPACE, PACKET RECEIVING UNIT, TRANSMISSION STATISTICS]<br>≠ [MEMORY SPACE, PACKET DETERMINING UNIT, RECEPTION STATISTICS] | | SOFTWARE,<br>PACKET DETERMINING UNIT |
| 12 | [MEMORY SPACE, PACKET DETERMINING UNIT, RECEPTION STATISTICS]<br>≠ [MEMORY SPACE, PACKET DETERMINING UNIT, TRANSMISSION STATISTICS] | | SOFTWARE,<br>PACKET DETERMINING UNIT |

PACKET RELAY DEVICE, PACKET RELAY SYSTEM, AND FAULT DETECTION METHOD

CLAIM OF PRIORITY

The present application claims priority from Japanese patent application JP 2011-259791 filed on Nov. 29, 2011, the content of which is hereby incorporated by reference into this application.

BACKGROUND OF THE INVENTION

1. Technical Field

The present invention relates to a packet relay device, a packet relay system, and a fault detection method, and more particularly to a packet relay device, a packet relay system, and a fault detection method, which specify a fault part when a fault occurs in the functions such as a packet transmitting function, a packet receiving function, and a packet transfer function, and/or in a module that executes the respective functions in the packet relay device.

2. Related Art

In the recent network, with the diversification of the network service, the packet relay device is remarkably multi-functionalized and functionally enhanced. Network protocols, network maintenance functions, and network operation functions, which support the network service, also trend to be increased.

First, software of the packet relay device realizes a path control using the network protocol, the network maintenance function, and the network operation function.

In the path control using the network protocol, the network maintenance function, and the network operation function, the software has a function of transmitting packets necessary for the control from a subject device, and a function of receiving the packets as packets addressed to the subject device. Up to now, the above-mentioned software has provided a packet transmitting and receiving function for each of the functions. However, with the multi-functionalized software, a software module structure is general in which a layer structure is independent from each software function having the packet transmitting and receiving function. As a result, when the software that realizes the packet transmitting function and the packet receiving function is viewed as a fault detection unit, the number of passing modules is increased.

Also, in hardware of the packet relay device, in order to realize the multi-functionality and the high functionality, the number of hardware devices configuring the packet relay device is increased. Also, the hardware is frequently formed of hardware devices on the market from the viewpoint of price competition.

SUMMARY OF THE INVENTION

The packet relay device realizes the packet transmitting function and the packet receiving function while the module of the above-mentioned software is associated with each device of the hardware, in the packet transmission from the subject device and the reception of the packet addressed to the subject device. However, as described above, because of an increase in the software module and the complexity of the hardware configuration, an unexpected fault may occur in the software module and the hardware device which realize the packet transmitting function and the packet receiving function. Also, if the hardware device is general-purpose parts, all of the faults may not be detected by the packet relay device per se. When all of the faults cannot be thus autonomously detected in all of the software modules and the hardware devices, which realize the packet transmitting function and the packet receiving function, the following problems arise.

In the packet relay device, when the packet transmitting function or the packet receiving function stops due to a fault that cannot be autonomously detected by the packet relay device, in the part that realizes the packet transmitting function or the packet receiving function, the packets are not normally transmitted or received. As a result, for example, a protocol control packet that controls the network protocol may not be normally transmitted or received so that an adjacency relationship between the network devices cannot be maintained. It is assumed that this affects not only the packet relay device, but also the overall network subscribed by the packet relay device.

Also, if there occurs a phenomenon that the packet is not normally transmitted or received due to a fault that cannot be autonomously detected by the packet relay device, in the part that realizes the packet transmitting function or the packet receiving function, it is assumed that it is very difficult to specify the fault part, and it takes a time to restore the fault part. Under the above circumstances, it is essential to increase the reliability of the packet relay device. A more reliable technique is generally to have a structure in which a large number of hardware devices are dispersed and mounted on boards, and which operates in a curtailed mode for stopping only the faulty board if a part of hardware devices fails, to continue the operation of the normal parts in the packet relay device. However, even in this case, there is a need to surely detect all of the faults and specify the fault parts.

In the recent packet relay device, for the purpose of solving the above-mentioned problem, it is general to provide a function of confirming the normality of the operation of the packet transmitting function and the packet receiving function through three systems stated below.

First, as disclosed in JP-A-2006-229477, there is a functional technique in which the subject device can confirm the normality of the operation of the packet transmitting function and the packet receiving function of the subject device.

However, in JP-A-2006-229477, in the packet transmission from the subject device and the reception of the packet addressed to the subject device, if the packet transmission and the packet reception are realized through a plurality of software modules and a plurality of hardware devices, the normality of the successive operation of the packet transmitting function and the packet receiving function can be confirmed. However, it is difficult to specify in what part forming the packet transmitting function and the packet receiving function the fault occurs.

Second, as illustrated in JP-A-2011-151470, there is a function for confirming the normality of the operation of the packet transmitting function and receiving function of the subject device from another device. However, in JP-A-2011-151470, if the discard of the packets is controlled by the packet receiving function and the packet transmitting function, the discarded part can be specified. However, if the packets are discarded or cannot be communicated by unexpected fault, it is difficult to specify apart that causes the stop of the packet relay.

Finally, an example of related-art in-subject-device function monitoring using the monitor packet will be described with reference to FIGS. 3 and 4A, 4B.

Hereinafter, the packet relay device is exemplified by a packet relay device including a CPU 301, a packet transmitting unit 302 of hardware having the packet transmitting function, a destination determining unit 303 that determines a relay path of the packet, a packet receiving unit 304 having the packet receiving function, and a memory space 305 in which software can store information.

The modules of software have functions for the example case where respective modules independently carry out the individual tasks on one CPU. Also, the software has a function for the example case in which an inter-software interface that transmits and receives the packets starts by queue, and an interface between inter-software modules that do not transmit and receive the packets starts by a function call. The CPU and the packet communication interfaces of the respective hardware have functions for the example case using queue, a transmitter side has functions for the example case in which the completion of loading into a queue of the destination is viewed as transmission success, a receiver side has functions for the example case in which the packets are received by confirming the packet reception detection in a given period, and it is assumed that the memory space can be freely accessed by the software.

First, the basic principle of the related art will be described with reference to FIGS. 3, 4A, 4B, and 5.

FIG. 3 is a functional block diagram of the packet relay device.

FIGS. 4A and 4B are flowcharts for specifying the fault part by a health monitoring function.

FIG. 5 is a diagram illustrating a monitoring packet structure.

The software that operates on the CPU 301 includes a timer unit 311 that determines a transmission interval of monitoring packets 341, a health check start unit 312 that creates each monitoring packet 341, a packet transmission start unit 313 that transmits the monitoring packet 341 to the hardware, a health check monitoring unit 314 that monitors the reception of the monitoring packet 341, a packet receiving unit 315 that receives the monitoring packet 341 from the hardware, a packet determining unit 316 that identifies the received monitoring packet 341 from other packets, and a health check result determining unit 317 that determines a health check monitoring result.

The memory space 305 includes a health check transmission number 321 that counts the transmission number of the monitoring packet 341, and a health check reception number 322 that counts the reception number of monitoring packets 141.

The timer unit 311 of the software times out every health check interval, and starts the health check start unit 312 of the software (401) (the number shown in parenthesis corresponds to the number illustrated in FIGS. 4A and 4B, as the case may be).

The health check start unit 312 of the software creates the monitoring packet 341. In this situation, as illustrated in FIG. 5, the health check start unit 312 sets an in-device return necessity flag 503 of in-device packet management information 502 to a return setting 504. Also, the health check start unit 312 sets a monitoring packet flag 505 of the in-device packet management information 502 to a monitoring packet setting 506.

The health check start unit 312 of the software then transmits the monitoring packet 341 to the packet transmission start unit 313 of the software. The health check start unit 312 of the software then counts up the health check transmission number 321 of the memory space 305. The health check start unit 312 of the software then starts the health check monitoring unit 314 of the software, and monitors the reception of a health check monitoring frame 341 (402).

The packet transmission start unit 313 of the software transmits the monitoring packet 341 to the packet transmitting unit 302 of the hardware (404).

Upon receiving the monitoring packet 341, the packet transmitting unit 302 of the hardware transmits the monitoring packet 341 to the destination determining unit 303 of the hardware (405).

Upon receiving the monitoring packet 341, the destination determining unit 303 of the hardware identifies the in-device return necessity flag 503 of the in-device packet management information 502 in the monitoring packet 341. Because a monitoring packet 501 is the return setting 504, the destination determining unit 303 of the hardware transmits the monitoring packet 341 to the packet receiving unit 304 of the hardware (406).

Upon receiving the monitoring packet 341, the packet receiving unit 304 of the hardware transmits the monitoring packet 341 to the CPU 301 (407).

Upon receiving the monitoring packet 341, the packet receiving processor 315 of the software transmits the monitoring packet 341 to the packet determining unit 316 of the software (408).

Upon receiving the monitoring packet 341, the packet determining unit 316 of the software determines that the received packet is the heath check monitoring frame 341 because the monitoring packet flag 505 of the in-device packet management information 502 in the received packet is the monitoring packet setting 506. Then, the packet determining unit 316 of the software counts up the health check reception number 322 of the memory space 305. The packet determining unit 316 of the software then stops the health check monitoring unit 314 of the software. The packet determining unit 316 of the software then starts the health check result determining unit 317 of the software (409).

The health check monitoring unit 314 of the software has a function of triggering interruption of the monitoring packet 341 at every given period to monitor the elapse of a specified time. With this function, the health check monitoring unit 314 monitors whether the monitoring packet 341 is received by the packet determining unit 316 of the software in time, or not. If the health check monitoring unit 314 of the software is stopped by the packet determining unit 316 of the software if the packet determining unit 316 of the software receives the monitoring packet 341 within a given time. On the other hand, if the packet determining unit 316 of the software does not receive the monitoring packet 341 within the given time, a heath check monitoring unit 314 recognizes a monitoring packet monitoring timeout with the elapse of the monitoring time by rule. If the monitoring packet monitoring timeout occurs, the health check monitoring unit 314 starts the health check result determining unit 317 of the software (403).

The health check result determining unit 317 of the software compares the health check transmission number 321 of the memory space 305 with the health check reception number 322. As a result of the comparison, if both of those numbers match each other, the health check result determining unit 317 of the software determines that the result is normal. On the other hand, as a result of the comparison, if both of those numbers do not match each other, the health check result determining unit 317 of the software determines that the result is abnormal (410).

As described above, in the related art, if there occurs a state in which the packets are discarded or cannot be communicated by the unexpected fault in any cases, even although the abnormality can be detected, it is difficult to specify a part that causes the stop of the packet relay.

As described above, in the related art, it is normally difficult to specify the fault part in the packet relay device that realizes the packet transmitting function and the packet receiving function through a plurality of software modules and a plurality of hardware devices.

The present invention has been made in view of the above circumstances, and therefore an object of the present invention is to provide a packet relay device, a packet relay system, and a fault detection method with high reliability, which can detect, by itself, a fault that cannot be autonomously detected by all or a specific software module and all or a specific hardware device which realize the respective functions such as the packet transmitting function and the packet receiving function in the packet relay device, and also specify a fault part.

In order to solve the above problem, according to the present invention, particularly, a unit that records pass information of a monitoring packet is provided in each of all or a specific software module and hardware device, whose operation is to be confirmed by the monitoring packet in a fault detection system that transmits and receives the monitoring packet in the packet relay device. Further, there is provided a fault part specifying unit that specifies a fault part by confirming each pass status of all or the specific software module and hardware device if an abnormality is detected by fault monitoring.

With the above configuration, the present invention can realize the packet relay device, the packet relay system, and the fault detection method with high reliability, which can detect, by itself, the fault that cannot be autonomously detected by the respective parts of each software module and each hardware device, and also specify the fault part.

According to an aspect of the present invention, there is provided a packet relay device that includes a CPU that can install software, a packet transmitting function, a packet relay path determining function, a packet receiving function, and a memory space in which the software on the CPU can store information, and a unit that detects a fault in the packet transmitting function and the packet receiving function by a transmitting function and a receiving function of a monitoring packet that periodically detects a fault in the packet transmitting function and the packet receiving function of a subject device, and realizes the transmission, relay, and reception of the packet by a plurality of software modules or a plurality of hardware devices, the packet relay device includes a unit that records pass information of the packet for each of the software modules on the memory space, a unit that records the pass information of the packet for each device associated with the packet transfer of the hardware, and a function for specifying a fault part by the packet pass information of the software and the hardware if a transmission number of the monitoring packet does not match a reception number thereof.

According to the first solving means of the present invention, there is provided a packet relay device comprising:

a CPU including a health check start unit, a packet transmission start unit, a health check monitoring unit, a packet receiving processor, a packet determining unit, a health check result determining unit, and a fault part specifying unit as software;

a memory including a health check transmission number that counts up a transmission number of a monitoring packet by the health check start unit, a health check reception number that counts up a reception number of the monitoring packet by the packet determining unit, health check start unit transmission statistics that count up the transmission number of the monitoring packet by the health check start unit, packet transmission start unit reception statistics that count up the reception number of the monitoring packet by the packet transmission start unit, packet transmission start unit transmission statistics that count up the transmission number of the monitoring packet by the packet transmission start unit, packet receiving unit reception statistics that count up the reception number of the monitoring packet by the packet receiving processor, packet receiving unit transmission statistics that count up the transmission number of the monitoring packet by the packet receiving processor, and packet determining unit reception statistics that count up the reception number of the monitoring packet by the packet determining unit; and a destination determining unit having transfer reception statistics that count up the reception number of the monitoring packet and transfer transmission statistics that count up the transmission number of the monitoring packet, as hardware, wherein the health check start unit transmits the monitoring packet to the packet transmission start unit, and counts up the health check transmission number and the health check start unit transmission statistics, upon receiving the monitoring packet, the packet transmission start unit counts up the packet transmission start unit reception statistics, transmits the monitoring packet toward the destination determining unit, and counts up the packet transmission start unit transmission statistics, upon receiving the monitoring packet, the destination determining unit counts up the transfer reception statistics, transmits the monitoring packet toward the packet receiving processor, and counts up the transfer transmission statistics, upon receiving the monitoring packet, the packet receiving processor counts up the packet receiving unit reception statistics, transmits the monitoring packet to the packet determining unit, and counts up the packet receiving unit transmission statistics, upon receiving the monitoring packet, the packet determining unit counts up the packet determining unit reception statistics and the health check reception number, when the packet determining unit does not receive the monitoring packet within a given time, the health check monitoring unit starts the health check result determining unit, the health check result determining unit compares the health check transmission number with the health check reception number, and if both of the numbers do not match each other, the health check result determining unit determines that the comparison result is abnormal, and starts the fault part specifying unit, and the fault part specifying unit determines a fault part corresponding to appropriate determination contents, according to the determination contents that predetermine what transmission number or transmission statistics is compared with what reception number or reception statistics in a determination sequence predetermined according to a transmission path of the monitoring packet to determine whether a determination result is matched or unmatched, and the fault parts corresponding to the determination contents, and displays fault information including the fault part in a display unit, or outputs the fault information to an output unit.

According to the second solving means of the present invention, there is provided a fault detection method in a packet relay device comprising:

a CPU including a health check start unit, a packet transmission start unit, a health check monitoring unit, a packet receiving processor, a packet determining unit, a health check result determining unit, and a fault part specifying unit as software;

a memory including a health check transmission number that counts up a transmission number of a monitoring packet by the health check start unit, a health check reception number that counts up a reception number of the monitoring packet by the packet determining unit, health check start unit transmission statistics that count up the transmission number of the monitoring packet by the health check start unit, packet transmission start unit reception statistics that count up the reception number of the monitoring packet by the packet transmission start unit, packet transmission start unit transmission statistics that count up the transmission number of the monitoring packet by the packet transmission start unit, packet receiving unit reception statistics that count up the reception number of the monitoring packet by the packet receiving processor, packet receiving unit transmission statistics that count up the transmission number of the monitoring packet by the packet receiving processor, and packet determining unit reception statistics that count up the reception number of the monitoring packet by the packet determining unit; and a destination determining unit having transfer reception statistics that count up the reception number of the monitoring packet and transfer transmission statistics that count up the transmission number of the monitoring packet, as hardware, wherein the health check start unit transmits the monitoring packet to the packet transmission start unit, and counts up the health check transmission number and the health check start unit transmission statistics, upon receiving the monitoring packet, the packet transmission start unit counts up the packet transmission start unit reception statistics, transmits the monitoring packet toward the destination determining unit, and counts up the packet transmission start unit transmission statistics, upon receiving the monitoring packet, the destination determining unit counts up the transfer reception statistics, transmits the monitoring packet toward the packet receiving processor, and counts up the transfer transmission statistics, upon receiving the monitoring packet, the packet receiving processor counts up the packet receiving unit reception statistics, transmits the monitoring packet to the packet determining unit, and counts up the packet receiving unit transmission statistics, upon receiving the monitoring packet, the packet determining unit counts up the packet determining unit reception statistics and the health check reception number, when the packet determining unit does not receive the monitoring packet within a given time, the health check monitoring unit starts the health check result determining unit, the health check result determining unit compares the health check transmission number with the health check reception number, and if both of the numbers do not match each other, the health check result determining unit determines that the comparison result is abnormal, and starts the fault part specifying unit, and the fault part specifying unit determines a fault part corresponding to appropriate determination contents, according to the determination contents that predetermine what transmission number or transmission statistics is compared with what reception number or reception statistics in a determination sequence predetermined according to a transmission path of the monitoring packet to determine whether a determination result is matched or unmatched, and the fault parts corresponding to the determination contents, and displays fault information including the fault part in a display unit, or outputs the fault information to an output unit.

According to the third solving means of the present invention, there is provided a packet relay system comprising:

a CPU including a health check start unit, a packet transmission start unit, a health check monitoring unit, a packet receiving processor, a packet determining unit, a health check result determining unit, and a fault part specifying unit as software;

a memory including a health check transmission number that counts up a transmission number of a monitoring packet by the health check start unit, a health check reception number that counts up a reception number of the monitoring packet by the packet determining unit, health check start unit transmission statistics that count up the transmission number of the monitoring packet by the health check start unit, packet transmission start unit reception statistics that count up the reception number of the monitoring packet by the packet transmission start unit, packet transmission start unit transmission statistics that count up the transmission number of the monitoring packet by the packet transmission start unit, packet receiving unit reception statistics that count up the reception number of the monitoring packet by the packet receiving processor, packet receiving unit transmission statistics that count up the transmission number of the monitoring packet by the packet receiving processor, and packet determining unit reception statistics that count up the reception number of the monitoring packet by the packet determining unit; and a destination determining apparatus having transfer reception statistics that count up the reception number of the monitoring packet and transfer transmission statistics that count up the transmission number of the monitoring packet, as hardware, wherein the health check start unit transmits the monitoring packet to the packet transmission start unit, and counts up the health check transmission number and the health check start unit transmission statistics, upon receiving the monitoring packet, the packet transmission start unit counts up the packet transmission start unit reception statistics, transmits the monitoring packet toward the destination determining unit, and counts up the packet transmission start unit transmission statistics, upon receiving the monitoring packet, the destination determining apparatus counts up the transfer reception statistics, transmits the monitoring packet toward the packet receiving processor, and counts up the transfer transmission statistics, the CPU acquires the transfer reception statistics and the transfer transmission statistics of the destination determining device, and stores these statistics in the memory, upon receiving the monitoring packet, the packet receiving processor counts up the packet receiving unit reception statistics, transmits the monitoring packet to the packet determining unit, and counts up the packet receiving unit transmission statistics, upon receiving the monitoring packet, the packet determining unit counts up the packet determining unit reception statistics and the health check reception number, when the packet determining unit does not receive the monitoring packet within a given time, the health check monitoring unit starts the health check result determining unit, the health check result determining unit compares the health check transmission number with the health check reception number, and if both of the numbers do not match each other, the health check result determining unit determines that the comparison result is abnormal, and starts the fault part specifying unit, and the fault part specifying unit determines a fault part corresponding to appropriate determination contents, according to the determination contents that predetermine what transmission number or transmission statistics is compared with what reception number or reception statistics in a determination sequence predetermined according to a transmission path of the monitoring packet to determine whether a determination result is matched or unmatched, and the fault parts corresponding to the determination contents, and displays fault information including the fault part in a display unit, or outputs the fault information to an output unit.

According to the present invention, there can be realized the packet relay device, the packet relay system, and the fault detection method, which can detect the fault in the packet transmitting function and the packet receiving function, and the fault associated with the packet receiving function and the like, detect the fault that cannot be autonomously detected by the respective modules of the software and the respective hardware devices by itself, and specify the fault part.

BRIEF DESCRIPTION OF THE DRAWINGS

FIG. 10 is a diagram for determining fault part specification implemented by a fault part specifying part according to this embodiment;

FIG. 11 is a diagram illustrating the fault part specification of the fault part specifying unit in the particular example 1 (monitoring packet is lost in the packet transmitting unit of the hardware) according to this embodiment; and FIG. 12 is a diagram illustrating the fault part specification of the fault part specifying unit in the particular example 2 (monitoring packet is lost in the packet receiving unit of the software) according to this embodiment.

PREFERRED EMBODIMENTS OF THE PRESENT INVENTION

An embodiment of the present invention will be described with reference to FIGS. 1 to 2A, 2B and 5 to 12.

In the following example, a packet relay device includes, as hardware, a CPU, a packet transmitting unit having a packet transmitting function, a destination determining unit that determines a relay path of a packet, a packet receiving unit having a receiving function of the packet, and a memory space in which software can store information.

As an example of the respective modules of software, the respective modules independently carry out the individual tasks. Also, as an example the software, an inter-software interface that transmits and receives the packet starts by queue, and an interface between inter-software modules that do not transmit and receive the packet starts by a function call. As an example of the CPU and the packet communication interfaces of the respective hardware, queue is used, as an example of a transmitter side the completion of loading into a queue of the destination is viewed as transmission success, as an example of a receiver side the packet is received by confirming the packet reception detection in a given period, and it is assumed that the memory space is freely accessible by the software.

First, the basic principle of this embodiment will be described with reference to FIGS. 1, 2A, 2B, 5, and 10.

Figure 1:
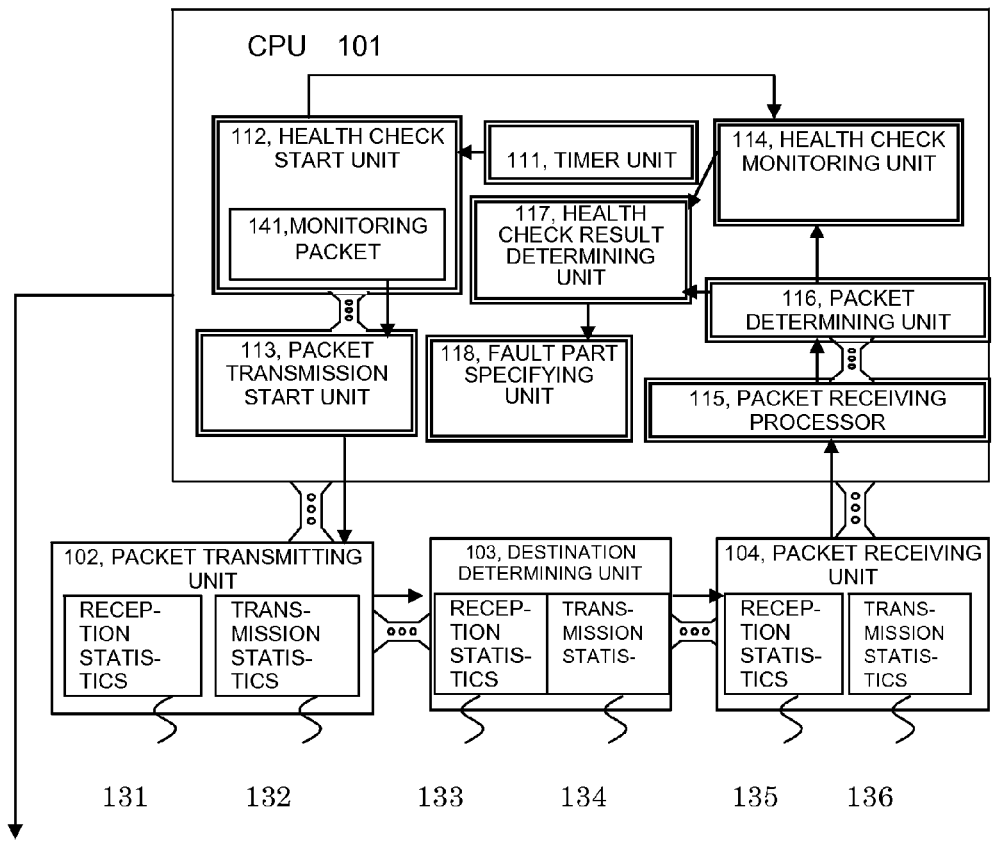
FIG. 1 is a functional block diagram for monitoring a fault and specifying a part by the aid of a monitoring packet in a packet relay device according to this embodiment.

FIG. 1 is a functional block diagram of the packet relay device.

Figure 2A:
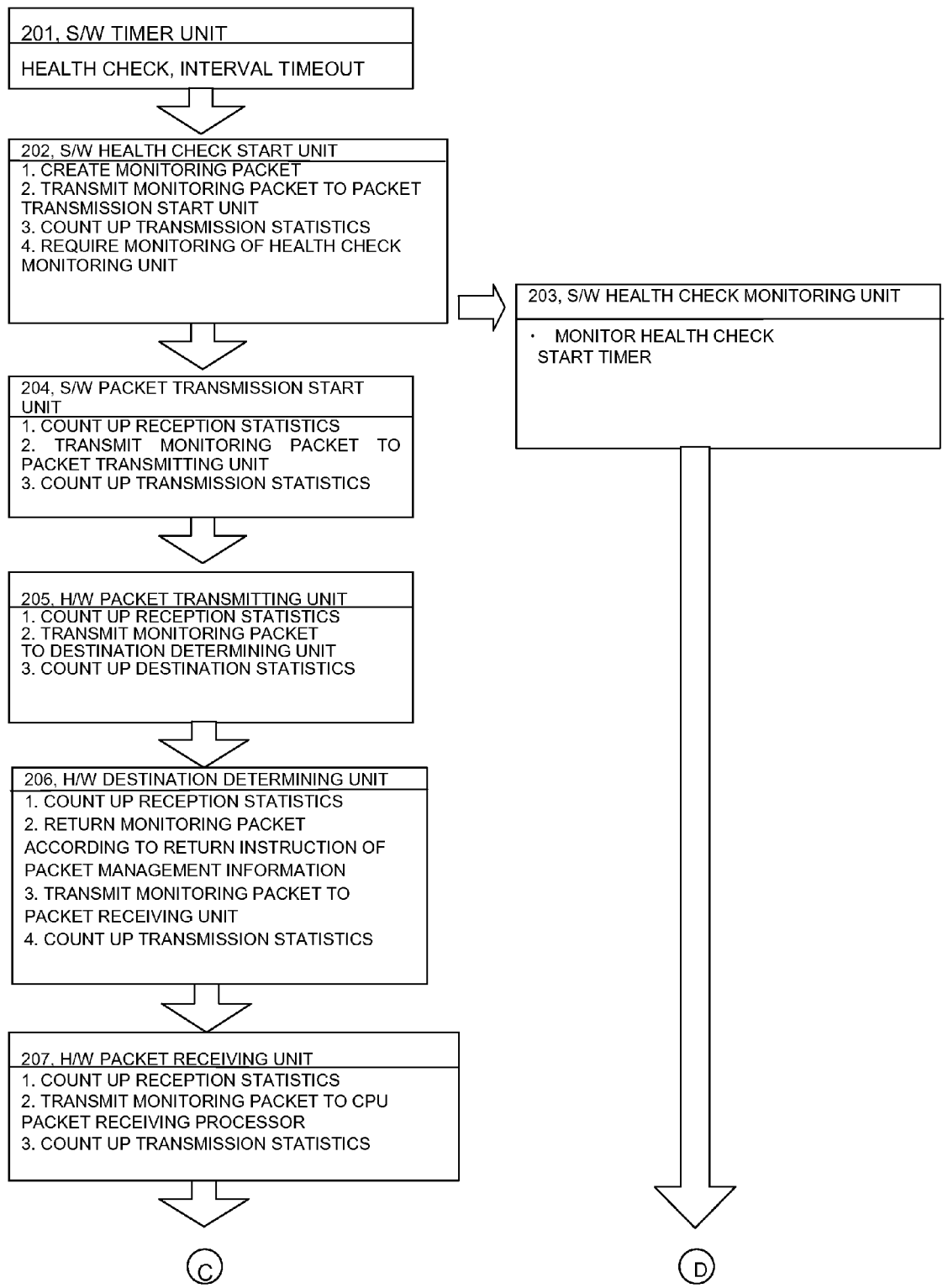
FIG. 2A is a flowchart (1/2) for detecting the fault and specifying the part by the aid of the monitoring packet in the packet relay device according this embodiment.
Figure 2B:
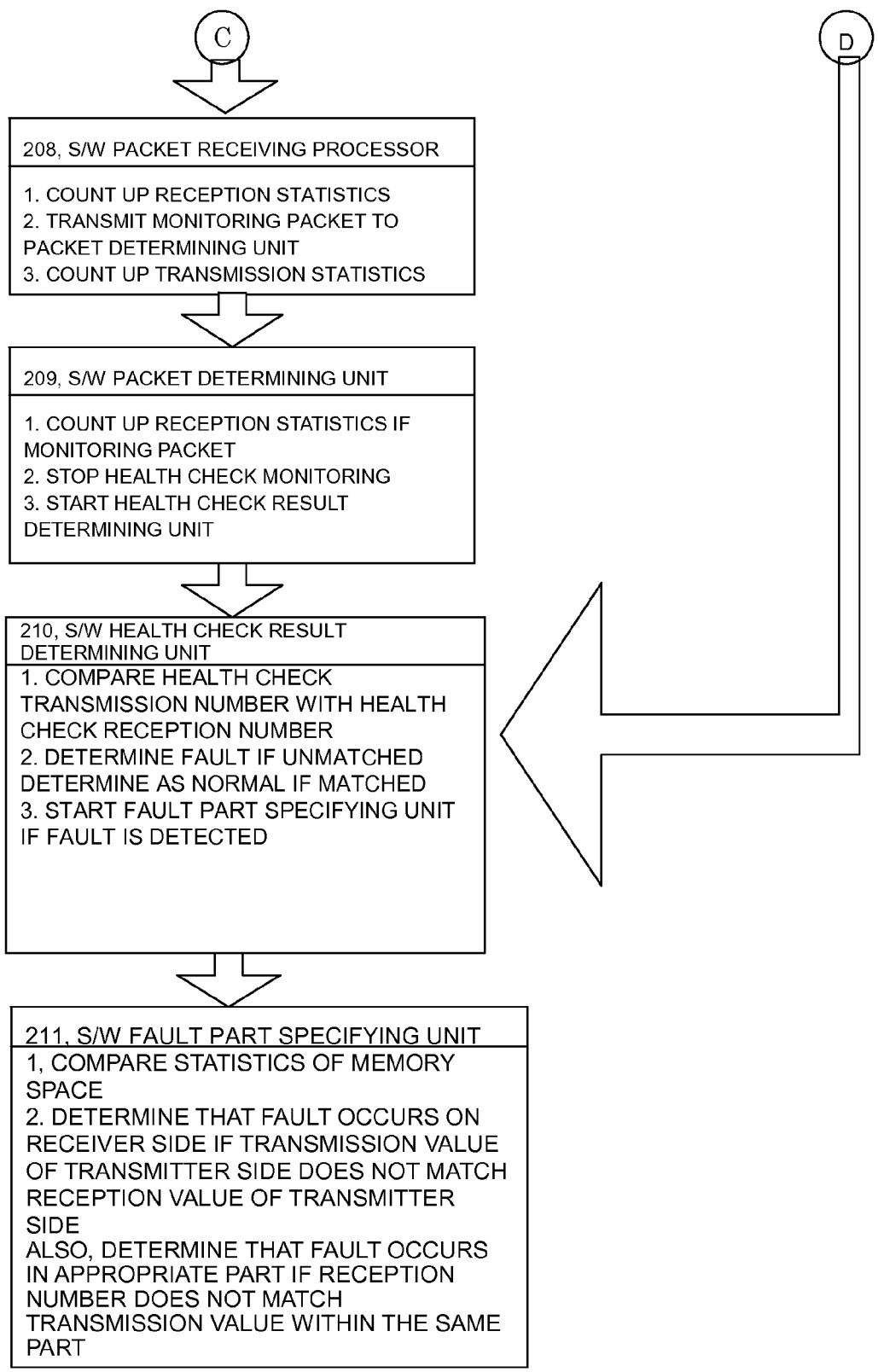
FIG. 2B is a flowchart (2/2) for detecting the fault and specifying the part by the aid of the monitoring packet in the packet relay device according this embodiment.
Figure 3:
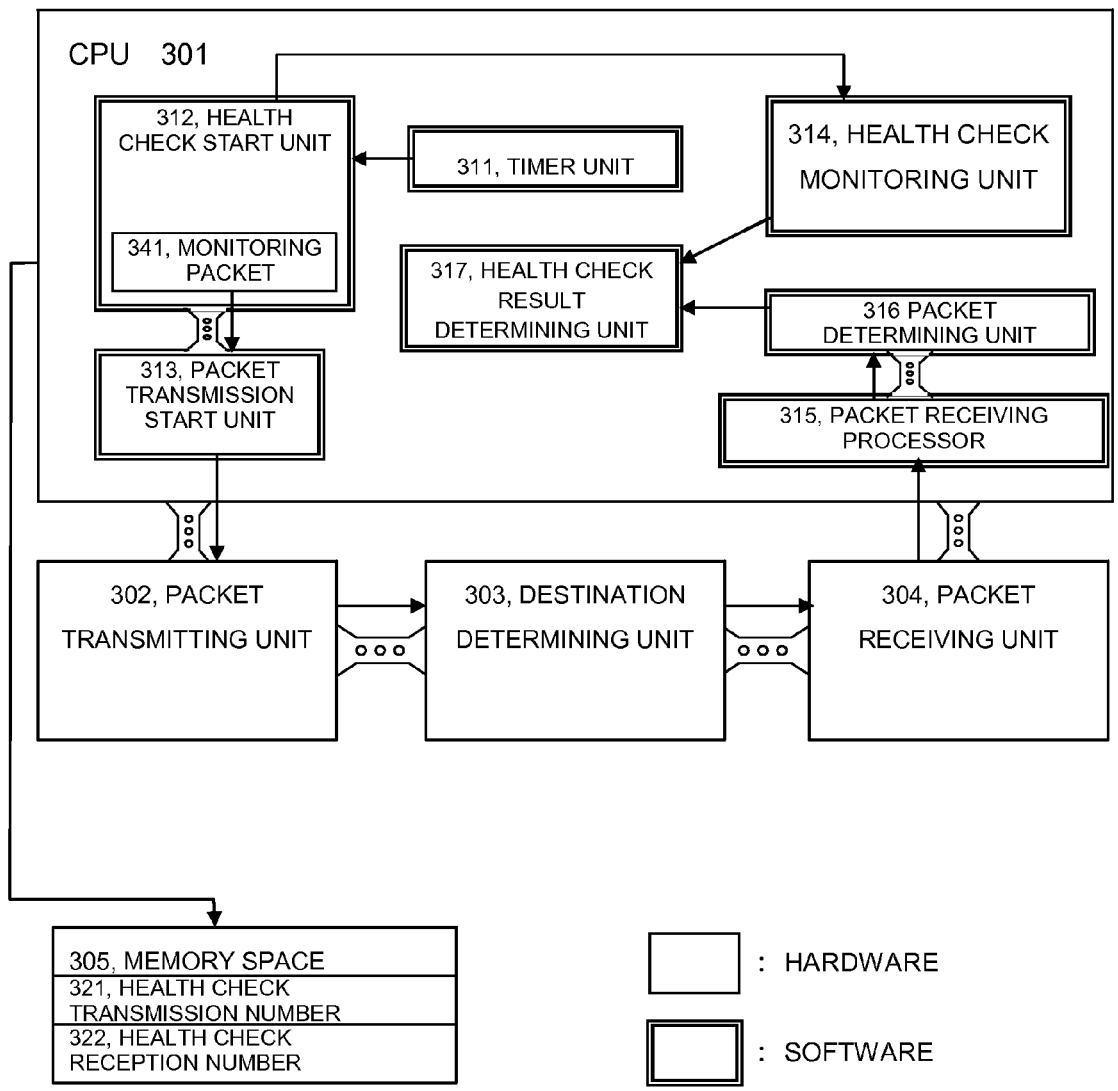
FIG. 3 is a functional block diagram for realizing the fault monitoring by the aid of a monitoring packet in a related-art packet relay device.
Figure 4A:
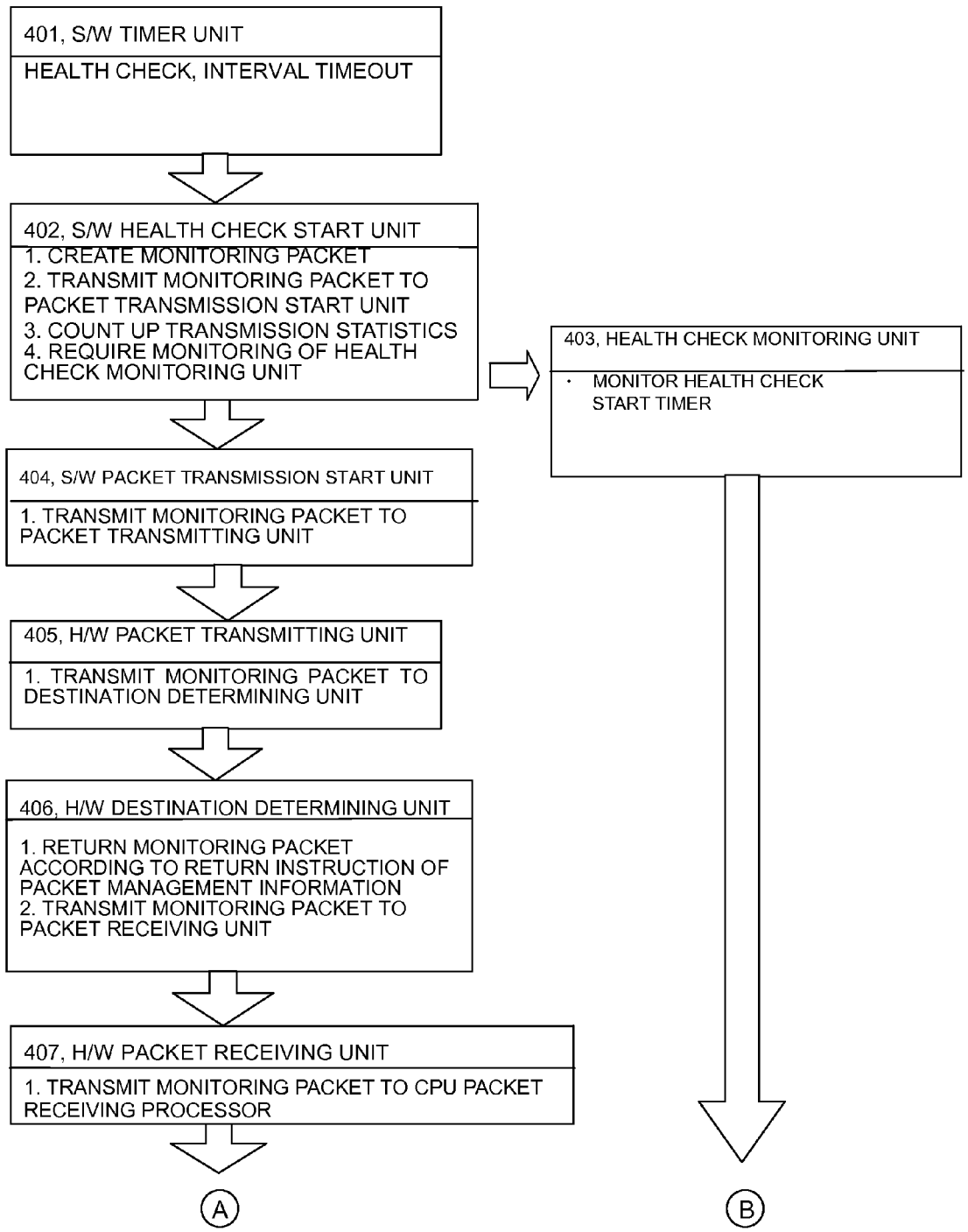
FIG. 4A is a flowchart (1/2) for detecting the fault by the aid of the monitoring packet in the related-art packet relay device.
Figure 4B:
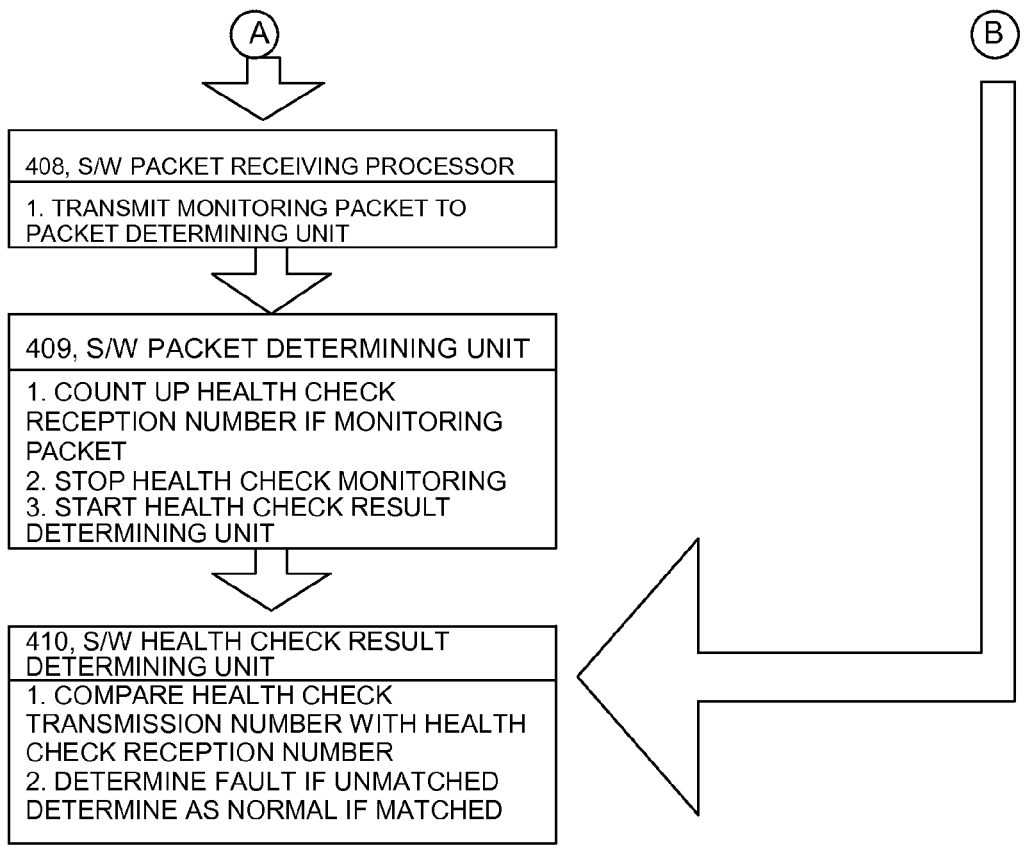
FIG. 4B is a flowchart (2/2) for detecting the fault by the aid of the monitoring packet in the related-art packet relay device.

FIGS. 2A and 2B are flowcharts for specifying a fault part by a health monitoring function.

Figure 5:
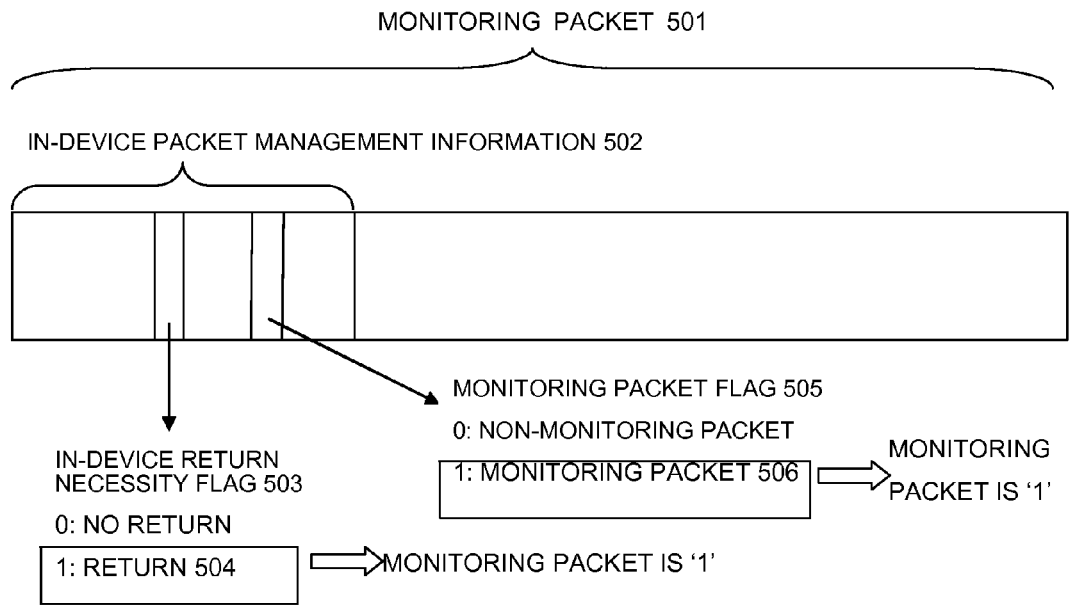
FIG. 5 is a diagram illustrating a monitoring packet structure.

FIG. 5 is a diagram illustrating a monitoring packet structure.

FIG. 10 is a diagram illustrating a fault part specifying method in a fault part specifying unit of the software. A fault part specifying unit 618 of the software may include a determination table illustrated in FIG. 10, or information on the determination table may be included in another memory, and the fault part specifying unit 618 of the software may refer to that information.

The software that operates on a CPU 101 includes a timer unit 111 that determines a transmission interval of monitoring packets 141, a health check start unit 112 that creates each monitoring packet 141, a packet transmission start unit 113 that transmits the monitoring packet 141 to the hardware, a health check monitoring unit 114 that monitors the reception of the monitoring packet 141, a packet receiving processor 115 that receives the monitoring packet 141 from the hardware, a packet determining unit 116 that identifies the received monitoring packet 141 from other packets, a health check result determining unit 117 that determines a health check monitoring result, and a fault part specifying unit 118 that specifies a fault part if a fault is detected in health check monitoring.

A packet transmitting unit 102 of the hardware includes reception statistics 131 that count up the reception number of the monitoring packets 141, and transmission statistics 132 that count up the transmission number of the monitoring packets 141.

A destination determining unit 103 of the hardware includes reception statistics 133 that count up the reception number of the monitoring packets 141, and transmission statistics 134 that count up the transmission number of the monitoring packets 141.

A packet receiving unit 104 of the hardware includes reception statistics 135 that count up the reception number of the monitoring packets 141, and transmission statistics 136 that count up the transmission number of the monitoring packets 141.

A memory space 105 includes a health check transmission number 121 that counts up the transmission number of the monitoring packets 141, a health check reception number 122 that counts up the reception number of the monitoring packets 141, health check start unit transmission statistics 123 that count up the transmission number of the monitoring packets 141 by the health check start unit 112 of the software, and packet transmission start unit reception statistics 124 that count up the reception number of the monitoring packets 141 by the packet transmission start unit 113. The memory space 105 also includes packet transmission start unit transmission statistics 125 that count up the transmission number of the monitoring packets 141 by the packet transmission start unit 113, packet receiving unit reception statistics 126 that count up the reception number of the monitoring packets 141 by the packet receiving processor 115, packet receiving unit transmission statistics 127 that count up the transmission number of the monitoring packets 141 by the packet receiving processor 115, and packet determining unit reception statistics 128 that count up the reception number of the monitoring packets 141 by the packet determining unit 116.

Hereinafter, the operation of the packet relay device will be described.

The timer unit 111 of the software times out every health check interval, and starts the health check start unit 112 of the software (201) (the number shown in parenthesis corresponds to the number illustrated in FIGS. 2A and 2B, as the case may be).

The health check start unit 112 of the software creates the monitoring packet 141. In this situation, the health check start unit 112 sets an in-device return necessity flag 503 of in-device packet management information 502 to a return setting 504. Also, the health check start unit 112 sets a monitoring packet flag 505 of the in-device packet management information 502 to a monitoring packet setting 506.

The health check start unit 112 of the software then transmits the monitoring packet 141 to the packet transmission start unit 113 of the software.

The health check start unit 112 of the software then counts up the health check transmission number 121 and the health check start unit transmission statistics 123 of the memory space 105.

The health check start unit 112 of the software then starts the health check monitoring unit 114 of the software, and monitors the reception of the monitoring packet 141 (202).

When first receiving the monitoring packet 141, the packet transmission start unit 113 of the software counts up the packet transmission start unit reception statistics 124 of the memory space 105. The packet transmission start unit 313 of the software then transmits the monitoring packet 141 to the packet transmitting unit 102 of the hardware. The packet transmission start unit 113 of the software then counts up the packet transmission start unit transmission statistics 125 of the memory space 105 (204).

In the respective units of the software modules and the hardware devices, the discrimination that the packet is the monitoring packet can be conducted by setting the monitoring packet flag 505 of FIG. 5 to the monitoring packet setting 506.

Upon receiving the monitoring packet 141, the packet transmitting unit 102 of the hardware counts up the reception statistics 131 thereof. The packet transmitting unit 102 of the hardware then transmits the monitoring packet 141 to the destination determining unit 103 of the hardware.

The packet transmitting unit 102 of the hardware then counts up the transmission statistics 132 thereof (205).

Upon receiving the monitoring packet 141, the destination determining unit 103 of the hardware counts up the reception statistics 133 thereof. The destination determining unit 103 of the hardware then identifies the in-device return necessity flag 503 of the in-device packet management information 502 of the monitoring packet 141. Because the monitoring packet 501 is set to the return setting 504, the destination determining unit 103 transmits the monitoring packet 141 to the packet receiving unit 104 of the hardware. The destination determining unit 103 of the hardware then counts up the transmission statistics 134 thereof (206). If the in-device return necessity flag 503 is no-return setting, the destination determining unit 103 does not transmit the received packet to the packet receiving unit 104, and sets an appropriate destination, and transfers the received packet to the set destination.

Upon receiving the monitoring packet 141, the packet receiving unit 104 of the hardware counts up the reception statistics 135 thereof. The packet receiving unit 104 of the hardware then transmits the monitoring packet 141 to the CPU 101. The packet receiving unit 104 of the hardware then counts up the transmission statistics 136 thereof (207).

Upon receiving the monitoring packet 141, the packet receiving processor 115 of the software counts up the packet receiving unit reception statistics 126 of the memory space 105. The packet receiving processor 115 of the software then transmits the monitoring packet 141 to the packet determining unit 116 of the software. The packet receiving processor 115 of the software then counts up the packet receiving unit transmission statistics 127 of the memory space 105 (208).

Upon receiving the monitoring packet 141, if the packet is the monitoring packet 141, the packet determining unit 116 of the software counts up the packet determining unit reception statistics 128 and the health check reception number 122 of the memory space 105. The packet determining unit 116 of the software then stops the health check monitoring unit 114 of the software. The packet determining unit 116 of the software then starts the health check result determining unit 117 of the software (209).

The health check monitoring unit 114 of the software has a function of triggering interruption of a hardware clock at every given period to monitor the elapse of a specified time. With this function, the health check monitoring unit 114 monitors whether the monitoring packet 141 is received by the packet determining unit 116 of the software within a given time, or not. If the health check monitoring unit 114 of the software is stopped by the packet determining unit 116 of the software if the packet determining unit 116 of the software receives the monitoring packet 141 within a given time. On the other hand, if the packet determining unit 116 of the software does not receive the monitoring packet 141 within the given time, the health check monitoring unit 114 recognizes a monitoring packet monitoring timeout with the elapse of the monitoring time by rule. If the monitoring packet monitoring timeout occurs, the health check monitoring unit 114 triggers the health check result determining unit 117 of the software (203).

Upon being triggered by the packet determining unit 116 of the software (if the monitoring packet is received) or the health check monitoring unit 114 (if the monitoring of the monitoring packet times out), the health check result determining unit 117 of the software compares the health check transmission number 121 with the health check reception number 122 in the memory space 105.

As a result of the comparison, if both of those numbers match each other, the health check result determining unit 117 of the software determines that the result is normal. On the other hand, as a result of the comparison, if both of those numbers do not match each other, the health check result determining unit 117 of the software determines that the result is abnormal, and starts the fault part specifying unit 118 (210).

The fault part specifying unit 118 of the software determines whether the comparison result corresponds to determination contents 1002, or not, in the order of a determination sequence 1001 illustrated in FIG. 10. As a result of the determination, if the comparison result corresponds to the determination contents, the fault part specifying unit 118 of the software determines a part indicated by a fault part 1003 on an appropriate column as a fault part (211).

The fault part specifying unit 118 of the software can display the determination result including the fault part in an appropriate display device, or output the determination result to an output device.

PARTICULAR EXAMPLE 1

Subsequently, as a particular example 1 of the fault part, a description will be given of a fault that processing stops after a packet transmitting unit 602 of the hardware has received a monitoring packet 641 with reference to FIGS. 5, 6, 8, and 11.

FIG. 5 is a diagram illustrating a monitoring packet structure.

Figure 6:
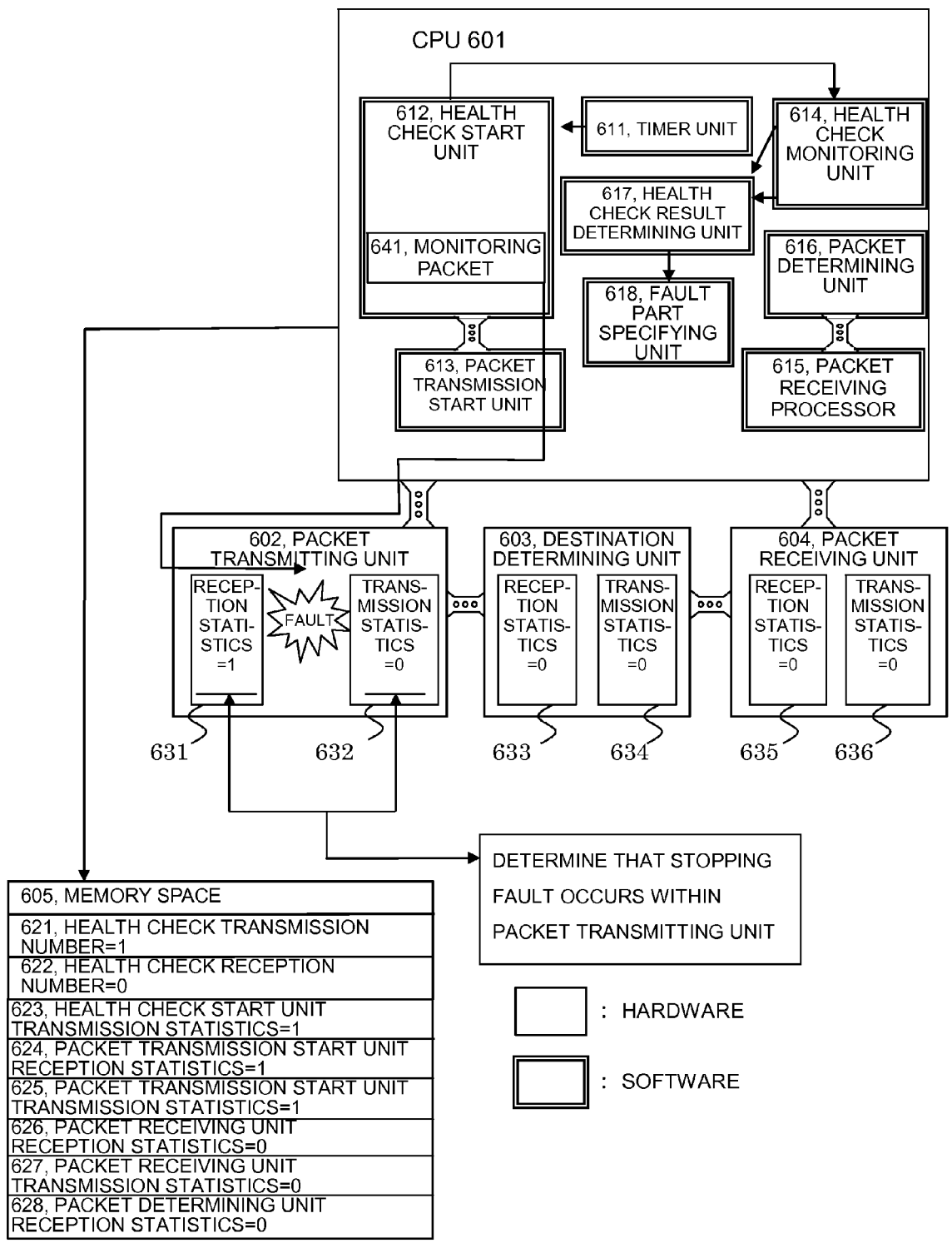
FIG. 6 is a diagram illustrating the operation of the packet relay device in a particular example 1 (monitoring packet is lost in a packet transmitting unit of the software) according to this embodiment.

FIG. 6 is a functional block diagram of the packet relay device.

Figure 8:
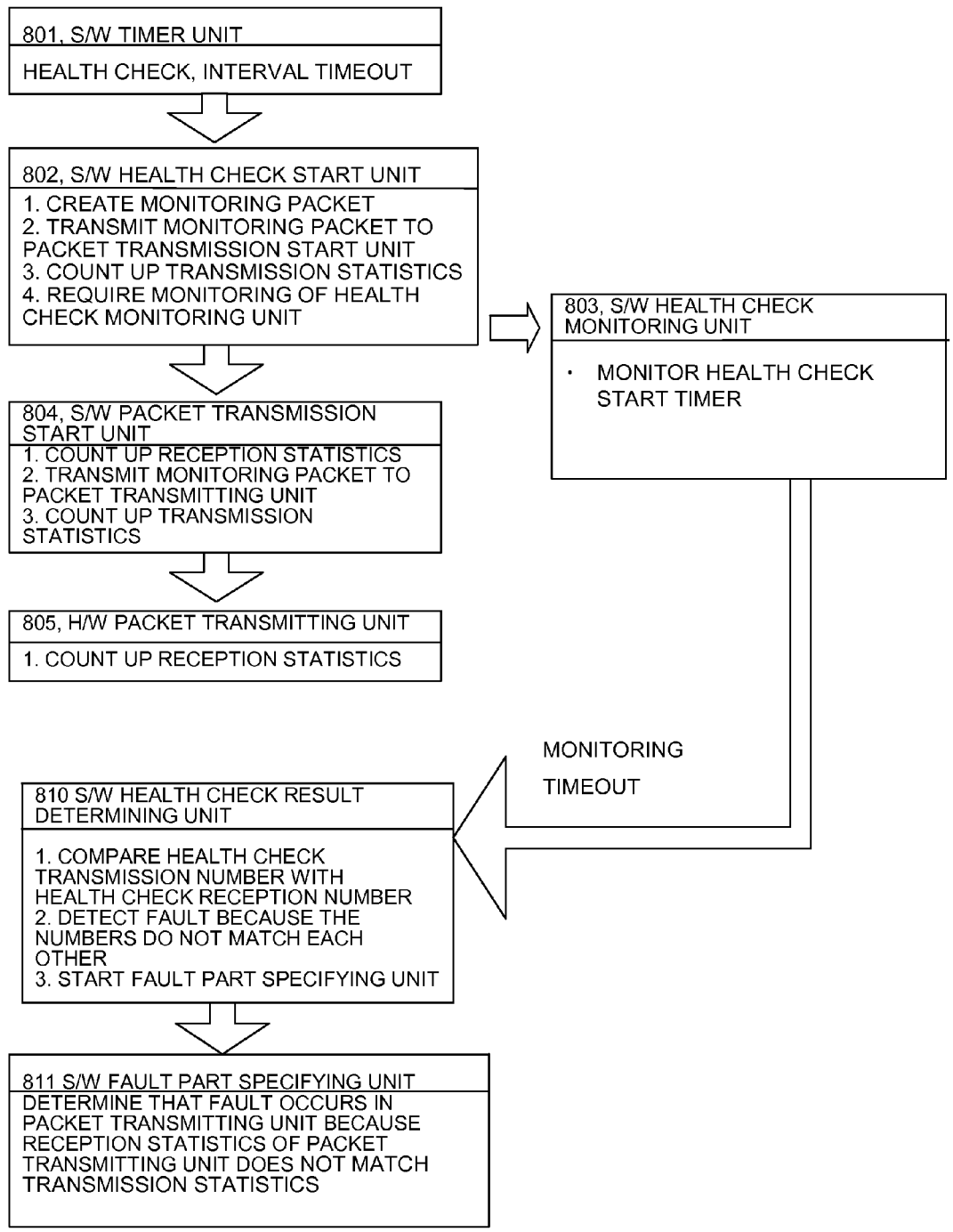
FIG. 8 is a flowchart of the particular example 1 (monitoring packet is lost in the packet transmitting unit of the hardware) according to this embodiment.

FIG. 8 is a flowchart for specifying the fault part when there occurs a fault that the monitoring packet 641 could not be transmitted after the packet transmitting unit 602 of the hardware has received the monitoring packet 641.

FIG. 11 is an illustrative view illustrating a method of specifying the packet transmitting unit 602 of the hardware as the fault part by the fault part specifying part of the software.

Hereinafter, the operation of the packet relay device will be described.

A timer unit 611 of the software times out 801 every health check interval, and starts a health check start unit 612 of the software (801) (the number shown in parenthesis corresponds to the number illustrated in FIG. 8, as the case may be).

The health check start unit 612 of the software creates the monitoring packet 641. In this situation, the in-device return necessity flag 503 of the in-device packet management information 502 is set to the return setting 504.

The health check start unit 612 of the software then transmits the health check monitoring packet 641 to a packet transmission start unit 613 of the software. The health check start unit 612 of the software then counts up a health check transmission number 621 and a health check start unit transmission statistics 623 in a memory space 605. The health check start unit 612 of the software then starts a health check monitoring unit 614 of the software, and monitors the reception of the health check monitoring flame 641 (802).

First, when receiving the health check monitoring packet 641, the packet transmission start unit 613 of the software determines that the frame is the monitoring packet 641 because the monitoring packet flag 505 of the in-device packet management information 502 of the received packet is the monitoring packet setting 506. Then, the packet transmission start unit 613 counts up packet transmission start unit reception statistics 624 of the memory space 605. The packet transmission start unit 613 of the software then transmits the monitoring packet 641 to the packet transmitting unit 602 of the hardware. The packet transmission start unit 613 of the software then counts up packet transmission start unit transmission statistics 625 of the memory space 605 (804).

Upon receiving the monitoring packet 641, the packet transmitting unit 602 of the hardware counts up reception statistics 631 thereof. A fault occurs in the packet transmitting unit 602 of the hardware, and all transfer of the monitoring packets 641 stops subsequently.

For that reason, the following components are not counted up, that is, transmission statistics 632 in the packet transmitting unit 602 of the hardware, reception statistics 633 in a destination determining unit 603 of the hardware, transmission statistics 634 in the destination determining unit 603 of the hardware, reception statistics 635 in a packet receiving unit 604 of the hardware, transmission statistics 636 in the packet receiving unit 604 of the hardware, packet receiving unit reception statistics 626 in the memory space 605, packet receiving unit transmission statistics 627 in the memory space 605, packet determining unit reception statistics 628 in the memory space 605, and a health check reception number 622 in the memory space 605 are not counted up.

Because the monitoring packet 641 is not received by a packet determining unit 616 of the software within a given time, the health check monitoring unit 614 of the software times out the monitoring of the monitoring packet, and starts a health check result determining unit 617 of the software (803).

The health check result determining unit 617 of the software is triggered by the health check monitoring unit 614, and compares the health check transmission number 621 with the health check reception number 622 in the memory space 605. As a result of the comparison, because those members do not match each other, the health check result determining unit 617 of the software determines that the result is abnormal, and starts the fault part specifying unit 618 (810).

The fault part specifying unit 618 of the software determines whether the comparison result corresponds to determination contents 1102, or not, in the order of a determination sequence 1101 illustrated in FIG. 11. First, the fault part specifying unit 618 implements the determination contents 1102 in No. 1 of the determination sequence 1101.

As a result of implementing the determination contents 1102 in No. 1 of the determination sequence 1101, because the determination contents 1102 are inappropriate, the fault part specifying unit 618 then implements the determination contents 1102 in No. 2 of the determination sequence 1101. As a result of implementing the determination contents 1102 in No. 2 of the determination sequence 1101, because the determination contents 1102 are inappropriate, the fault part specifying unit 618 then implements the determination contents 1102 in No. 3 of the determination sequence 1101. As a result of implementing the determination contents 1102 in No. 3 of the determination sequence 1101, because the determination contents 1102 are inappropriate, the fault part specifying unit 618 then implements the determination contents 1102 in No. 4 of the determination sequence 1101. As a result of implementing the determination contents 1102 in No. 4 of the determination sequence 1101, because the determination contents 1102 are appropriate, the fault part specifying unit 618 specifies the packet transmitting unit of the hardware indicated by a fault part 1103 as the fault part (811).

PARTICULAR EXAMPLE 2

Subsequently, as a particular example 2 of the fault part, a description will be given of a fault that a packet receiving processor 715 of the software cannot receive a monitoring packet 741 with reference to FIGS. 5, 7, 9A, 9B, and 12.

FIG. 5 is a diagram illustrating a monitoring packet structure.

Figure 7:
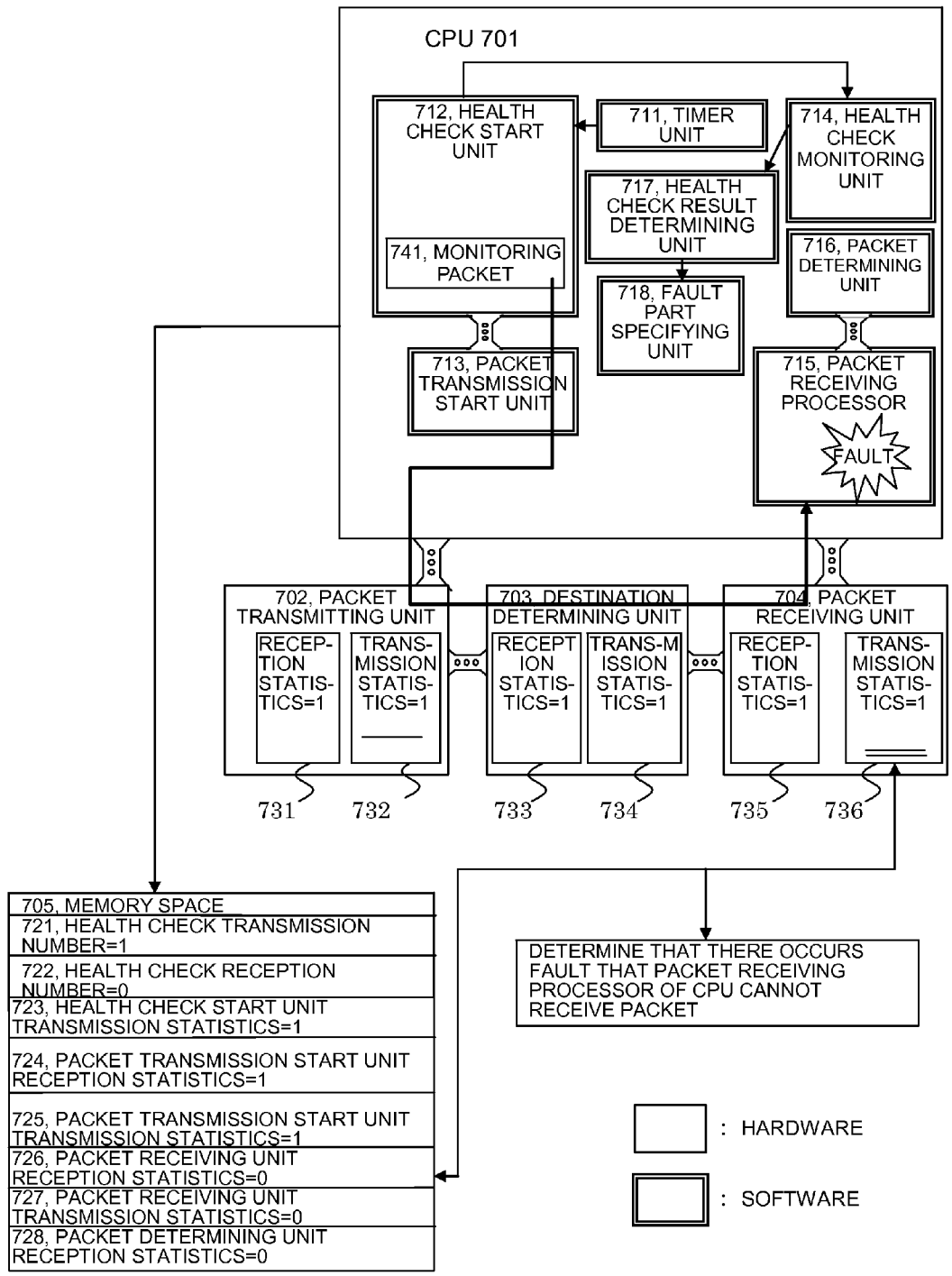
FIG. 7 is a diagram illustrating the operation of the packet relay device in a particular example 2 (monitoring packet is lost in a packet receiving processor of the software) according to this embodiment.

FIG. 7 is a functional block diagram of the packet relay device.

Figure 9A:
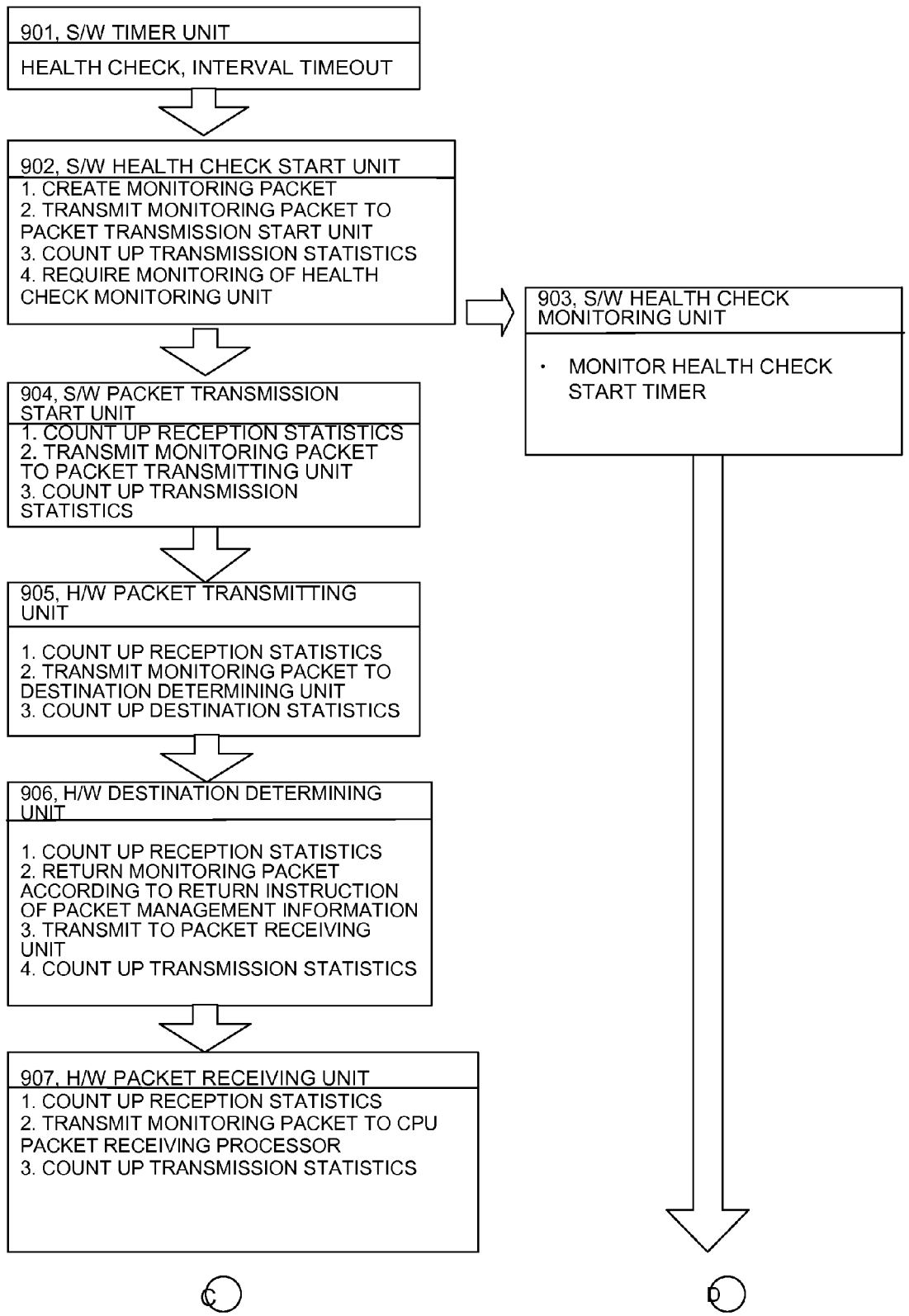
FIG. 9A is a flowchart (1/2) of the particular example 2 (monitoring packet is lost in the packet receiving processor of the software) according to this embodiment.
Figure 9B:
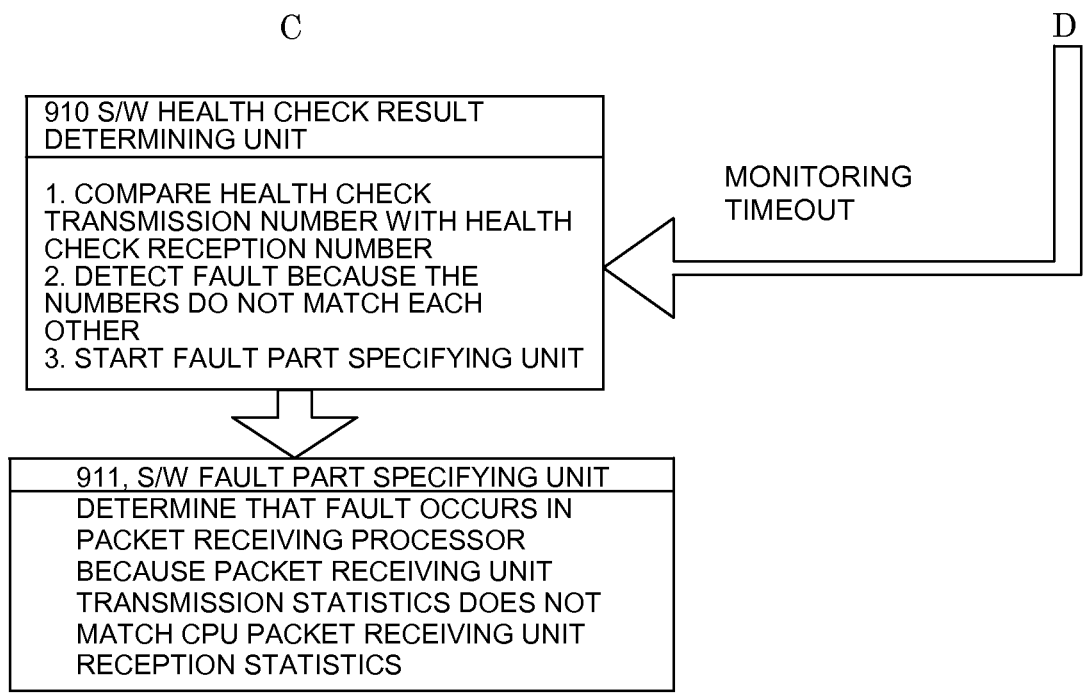
FIG. 9B is a flowchart (2/2) of the particular example 2 (monitoring packet is lost in the packet receiving processor of the software) according to this embodiment.

FIGS. 9A and 9B are flowcharts for specifying the fault part when there occurs a fault that the packet receiving processor 715 of the software cannot receive the monitoring packet 741.

FIG. 12 is an illustrative view illustrating a method of specifying that the packet receiving processor 715 of the software is the fault part by the fault part specifying part of the software.

Hereinafter, the operation of the packet relay device will be described.

A timer unit 711 of the software times out 901 every health check interval, and starts a health check start unit 712 of the software (901) (the number shown in parenthesis corresponds to the number illustrated in FIGS. 9A and 9B, as the case may be).

The health check start unit 712 of the software creates the monitoring packet 741. In this situation, the in-device return necessity flag 503 of the in-device packet management information 502 is set to the return setting 504.

The health check start unit 712 of the software then transmits the health check monitoring packet 741 to a packet transmission start unit 713 of the software. The health check start unit 712 of the software then counts up a health check transmission number 721 and a health check start unit transmission statistics 723 in a memory space 705. The health check start unit 712 of the software then starts a health check monitoring unit 714 of the software, and monitors the reception of the health check monitoring flame 741 (902).

First, when receiving the health check monitoring flame 741, the packet transmission start unit 713 of the software counts up packet transmission start unit reception statistics 724 of the memory space 705. The packet transmission start unit 713 of the software then transmits the monitoring packet 741 to a packet transmitting unit 702 of the hardware. The packet transmission start unit 713 of the software then counts up packet transmission start unit transmission statistics 725 of the memory space 705 (904).

Upon receiving the monitoring packet 741, the packet transmitting unit 702 counts up reception statistics 731 thereof. The packet transmitting unit 702 of the hardware then transmits the monitoring packet 741 to a destination determining unit 703 of the hardware.

The packet transmitting unit 702 of the hardware then counts up transmission statistics 732 thereof (905).

Upon receiving the monitoring packet 741, the destination determining unit 703 of the hardware counts up reception statistics 733 thereof. The destination determining unit 703 of the hardware then identifies the in-device return necessity flag 503 of the in-device packet management information 502 in the monitoring packet 741. Because the monitoring packet 501 is set to the return setting 504, the destination determining unit 703 transmits the monitoring packet 741 to a packet receiving unit 704 of the hardware. The destination determining unit 703 of the hardware then counts up transmission statistics 734 thereof (906).

Upon receiving the monitoring packet 741, the packet receiving unit 704 of the hardware counts up reception statistics 735 thereof. The packet receiving unit 704 of the hardware then transmits the monitoring packet 741 to a CPU 701. The packet receiving unit 704 of the hardware then counts up transmission statistics 736 thereof (907).

There occurs a fault that the packet receiving processor 715 of the software cannot receive the monitoring packet 741, and subsequently, all transfer of the monitoring packets 741 stops.

For that reason, packet receiving unit reception statistics 726 of the memory space 705, packet receiving unit transmission statistics 727 of the memory space 705, packet determining unit reception statistics 728 of the memory space 705, and a health check receiving number 722 of the memory space 705 are not counted up.

Because the monitoring packet 741 is not received by a packet determining unit 716 of the software within a given time, the health check monitoring unit 714 of the software times out the monitoring of the monitoring packet, and starts a health check result determining unit 717 of the software (903).

The health check result determining unit 717 of the software is triggered by the health check monitoring unit 614 of the software, and compares the health check transmission number 721 with the health check receiving number 722 in the memory space 705. As a result of the comparison, because those numbers do not match each other, the health check result determining unit 717 of the software determines that the comparison result is abnormal, and starts a fault part specifying unit 718.

The fault part specifying unit 718 of the software determines whether the comparison result is set to determination contents 1202, or not, in the order of a determination sequence 1201 illustrated in FIG. 12. First, the fault part specifying unit 718 of the software implements the determination contents 1202 in No. 1 of the determination sequence 1201.

As a result of implementing the determination contents 1202 in No. 1 of the determination sequence 1201, because the determination contents 1202 are inappropriate, the fault part specifying unit 718 of the software then implements the determination contents 1202 in No. 2 of the determination sequence 1201. As a result of implementing the determination contents 1202 in No. 2 of the determination sequence 1201, because the determination contents 1202 are inappropriate, the fault part specifying unit 718 then implements the determination contents 1202 in No. 3 of the determination sequence 1201. As a result of implementing the determination contents 1202 in No. 3 of the determination sequence 1201, because the determination contents 1102 are inappropriate, the fault part specifying unit 718 of the software then implements the determination contents 1202 in No. 4 of the determination sequence 1201. As a result of implementing the determination contents 1202 in No. 4 of the determination sequence 1201, because the determination contents 1202 are inappropriate, the fault part specifying unit 718 of the software then implements the determination contents 1202 in No. 5 of the determination sequence 1201. As a result of implementing the determination contents 1202 in No. 5 of the determination sequence 1201, because the determination contents 1202 are inappropriate, the fault part specifying unit 718 of the software then implements the determination contents 1202 in No. 6 of the determination sequence 1201. As a result of implementing the determination contents 1202 in No. 6 of the determination sequence 1201, because the determination contents 1202 are inappropriate, the fault part specifying unit 718 of the software then implements the determination contents 1202 in No. 7 of the determination sequence 1201. As a result of implementing the determination contents 1202 in No. 7 of the determination sequence 1201, because the determination contents 1202 are inappropriate, the fault part specifying unit 718 of the software then implements the determination contents 1202 in No. 8 of the determination sequence 1201. As a result of implementing the determination contents 1202 in No. 8 of the determination sequence 1201, because the determination contents 1202 are inappropriate, the fault part specifying unit 718 of the software then implements the determination contents 1202 in No. 9 of the determination sequence 1201. As a result of implementing the determination contents 1202 in No. 9 of the determination sequence 1201, because the determination contents 1202 are appropriate, the fault part specifying unit 718 of the software specifies the packet receiving unit of the software indicated by a fault part 1203 as the fault part.

In the above description, the memory spaces indicative of the transmission number and the reception number are provided in all of the software modules within the CPU, and the statistics indicative of the transmission number and the reception number are provided in all of the hardware devices. However, those memory spaces and statistics are not limited to all of the software modules and hardware devices, but may be provided in a specific software module and a specific hardware device. Also, the packet transmitting unit 102, the destination determining unit 103, and/or the packet receiving unit 104 of the hardware devices are not always disposed within the same device as the CPU 101, but may be configured as another device. For example, in that case, the CPU may acquire information on the reception statistics and the transmission statistics in the respective devices at appropriate timing through an appropriate network, and save those in the memory space, and the fault part specifying unit may refer to the information therein. Further, the type and number of respective modules within the CPU, and the type and number of respective units in the hardware may be also appropriately determined.

What is claimed is:

1. A packet relay device comprising:
    a CPU including a health check start unit, a packet transmission start unit, a health check monitoring unit, a packet receiving processor, a packet determining unit, a health check result determining unit, and a fault part specifying unit,
    a memory comprising computer readable instructions which when executed comprise determining a health check transmission number that counts up a transmission number of a monitoring packet by the health check start unit, a health check reception number that counts up a reception number of the monitoring packet by the packet determining unit, health check start unit transmission statistics that count up the transmission number of the monitoring packet by the health check start unit, packet transmission start unit reception statistics that count up the reception number of the monitoring packet by the packet transmission start unit, packet transmission start unit transmission statistics that count up the transmission number of the monitoring packet by the packet transmission start unit, packet receiving unit reception statistics that count up the reception number of the monitoring packet by the packet receiving processor, packet receiving unit transmission statistics that count up the transmission number of the monitoring packet by the packet receiving processor, and packet determining unit reception statistics that count up the reception number of the monitoring packet by the packet determining unit; and
    a destination determining unit having transfer reception statistics that count up the reception number of the monitoring packet and transfer transmission statistics that count up the transmission number of the monitoring packet, wherein
    the health check start unit transmits the monitoring packet to the packet transmission start unit, and counts up the health check transmission number and the health check start unit transmission statistics,
    upon receiving the monitoring packet, the packet transmission start unit counts up the packet transmission start unit reception statistics, transmits the monitoring packet toward the destination determining unit, and counts up the packet transmission start unit transmission statistics,
    upon receiving the monitoring packet, the destination determining unit counts up the transfer reception statistics, transmits the monitoring packet toward the packet receiving processor, and counts up the transfer transmission statistics,
    upon receiving the monitoring packet, the packet receiving processor counts up the packet receiving unit reception statistics, transmits the monitoring packet to the packet determining unit, and counts up the packet receiving unit transmission statistics,
    upon receiving the monitoring packet, the packet determining unit counts up the packet determining unit reception statistics and the health check reception number,
    when the packet determining unit does not receive the monitoring packet within a given time, the health check monitoring unit starts the health check result determining unit,
    the health check result determining unit compares the health check transmission number with the health check reception number, and if both of the numbers do not match each other, the health check result determining unit determines that the comparison result is abnormal, and starts the fault part specifying unit, and
    the fault part specifying unit determines a fault part corresponding to appropriate determination contents, according to the determination contents that predetermine what transmission number or transmission statistics is compared with what reception number or reception statistics in a determination sequence predetermined according to a transmission path of the monitoring packet to determine whether a determination result is matched or unmatched, and the fault parts corresponding to the determination contents, and displays fault information including the fault part in a display unit, or outputs the fault information to an output unit.

2. The packet relay device according to claim 1, further comprising:
    a determination table that defines the contents that compare the transmission statistics from a first part with the reception statistics in a second part, or the contents that compares the transmission statistic from the first part with the reception statistics in the first part, according to a sequence of the path in which the monitoring packet is transmitted from the health check start unit, and received by the packet determining unit, as the determination contents, by a predetermined determination sequence, and defines the first part as the fault part when the determination contents are unmatched, and
wherein the fault part specifying unit determines the fault part with reference to the determination table.

3. The packet relay device according to claim 1, further comprising:
    a timer unit that starts the health check start unit every predetermined check interval, and determines a transmission interval of the monitoring packet.

4. The packet relay device according to claim 1,
wherein the monitoring packet includes a return necessity flag as a return setting, and a monitoring packet flag set as the monitoring packet,
the transfer determining unit returns the received packet as the monitoring packet if the return necessity flag is the return setting, while the transfer determining unit transfers the received packet to destination if the return necessity flag is no return setting, and
the packet determining unit determines that the monitoring packet is received if the monitoring packet flag is set to the monitoring packet setting.

5. The packet relay device according to claim 1, further comprising:
a first hardware part that includes first reception statistics that count up the reception number of the monitoring packet and first transmission statistics that count up the transmission number of the monitoring packet, receives the monitoring packet from the packet transmission start unit, and transmits the monitoring packet to the destination determining unit,
wherein
the packet transmission start unit transmits the monitoring packet to the first hardware part,
upon receiving the monitoring packet, the first hardware part counts up the first reception statistics, transmits the monitoring packet to the destination determining unit, and counts up the first transmission statistics, and
the fault part specifying unit can determine the fault part with reference to the first reception statistics and the first transmission statistics.

6. The packet relay device according to claim 1, further comprising:
a second hardware part that includes second reception statistics that count up the reception number of the monitoring packet and second transmission statistics that count up the transmission number of the monitoring packet, receives the monitoring packet from the destination determining unit, and transmits the monitoring packet to the packet receiving processor,
wherein
the destination determining unit transmits the monitoring packet to the second hardware part,
upon receiving the monitoring packet, the second hardware part counts up the second reception statistics, the second hardware part transmits the monitoring packet to the packet receiving processor, and the second hardware part counts up the second transmission statistics, and
the fault part specifying unit can determine the fault part with reference to the second reception statistics and the second transmission statistics.

7. The packet relay device according to claim 1, further comprising:
a first hardware part that includes first reception statistics that count up the reception number of the monitoring packet and first transmission statistics that count up the transmission number of the monitoring packet, receives the monitoring packet from the packet transmission start unit, and transmits the monitoring packet to the destination determining unit, and
a second hardware part that includes second reception statistics that count up the reception number of the monitoring packet and second transmission statistics that count up the transmission number of the monitoring packet, receives the monitoring packet from the destination determining unit, and transmits the monitoring packet to the packet receiving processor,
wherein
the packet transmission start unit transmits the monitoring packet to the first hardware part,
upon receiving the monitoring packet, the first hardware part counts up the first reception statistics, transmits the monitoring packet to the destination determining unit, and counts up the first transmission statistics,
the destination determining unit transmits the monitoring packet to the second hardware part,
upon receiving the monitoring packet, the second hardware part counts up the second reception statistics, the second hardware part transmits the monitoring packet to the packet receiving processor, and the second hardware part counts up the second transmission statistics, and
the fault part specifying unit can determine the fault part with reference to the first and second reception statistics, and the first and second transmission statistics.

8. The packet relay device according to claim 1,
wherein, upon receiving the monitoring packet, the packet determining unit stops the health check monitoring unit, and the packet determining unit starts the health check result determining unit, and
if the packet determining unit receives the monitoring packet within a given time, the packet determining unit stops the health check monitoring unit.

9. A fault detection method in a packet relay device comprising:
a CPU including a health check start unit, a packet transmission start unit, a health check monitoring unit, a packet receiving processor, a packet determining unit, a health check result determining unit, and a fault part specifying unit;
a memory comprising computer readable instructions which when executed comprise determining a health check transmission number that counts up a transmission number of a monitoring packet by the health check start unit, a health check reception number that counts up a reception number of the monitoring packet by the packet determining unit, health check start unit transmission statistics that count up the transmission number of the monitoring packet by the health check start unit, packet transmission start unit reception statistics that count up the reception number of the monitoring packet by the packet transmission start unit, packet transmission start unit transmission statistics that count up the transmission number of the monitoring packet by the packet transmission start unit, packet receiving unit reception statistics that count up the reception number of the monitoring packet by the packet receiving processor, packet receiving unit transmission statistics that count up the transmission number of the monitoring packet by the packet receiving processor, and packet determining unit reception statistics that count up the reception number of the monitoring packet by the packet determining unit, and
a destination determining unit having transfer reception statistics that count up the reception number of the monitoring packet and transfer transmission statistics that count up the transmission number of the monitoring packet,
wherein
the health check start unit transmits the monitoring packet to the packet transmission start unit, and counts up the health check transmission number and the health check start unit transmission statistics,
upon receiving the monitoring packet, the packet transmission start unit counts up the packet transmission start unit reception statistics, transmits the monitoring packet toward the destination determining unit, and counts up the packet transmission start unit transmission statistics, upon receiving the monitoring packet, the destination determining unit counts up the transfer reception statistics, transmits the monitoring packet toward the packet receiving processor, and counts up the transfer transmission statistics, upon receiving the monitoring packet, the packet receiving processor counts up the packet receiving unit reception statistics, transmits the monitoring packet to the packet determining unit, and counts up the packet receiving unit transmission statistics, upon receiving the monitoring packet, the packet determining unit counts up the packet determining unit reception statistics and the health check reception number, when the packet determining unit does not receive the monitoring packet within a given time, the health check monitoring unit starts the health check result determining unit, the health check result determining unit compares the health check transmission number with the health check reception number, and if both of the numbers do not match each other, the health check result determining unit determines that the comparison result is abnormal, and starts the fault part specifying unit, and the fault part specifying unit determines a fault part corresponding to appropriate determination contents, according to the determination contents that predetermine what transmission number or transmission statistics is compared with what reception number or reception statistics in a determination sequence predetermined according to a transmission path of the monitoring packet to determine whether a determination result is matched or unmatched, and the fault parts corresponding to the determination contents, and displays fault information including the fault part in a display unit, or outputs the fault information to an output unit.

10. A packet relay system comprising:

a CPU including a health check start unit, a packet transmission start unit, a health check monitoring unit, a packet receiving processor, a packet determining unit, a health check result determining unit, and a fault part specifying unit, a memory comprising computer readable instructions which when executed comprise determining a health check transmission number that counts up a transmission number of a monitoring packet by the health check start unit, a health check reception number that counts up a reception number of the monitoring packet by the packet determining unit, health check start unit transmission statistics that count up the transmission number of the monitoring packet by the health check start unit, packet transmission start unit reception statistics that count up the reception number of the monitoring packet by the packet transmission start unit, packet transmission start unit transmission statistics that count up the transmission number of the monitoring packet by the packet transmission start unit, packet receiving unit reception statistics that count up the reception number of the monitoring packet by the packet receiving processor, packet receiving unit transmission statistics that count up the transmission number of the monitoring packet by the packet receiving processor, and packet determining unit reception statistics that count up the reception number of the monitoring packet by the packet determining unit, and a destination determining apparatus having transfer reception statistics that count up the reception number of the monitoring packet and transfer transmission statistics that count up the transmission number of the monitoring packet, wherein the health check start unit transmits the monitoring packet to the packet transmission start unit, and counts up the health check transmission number and the health check start unit transmission statistics, upon receiving the monitoring packet, the packet transmission start unit counts up the packet transmission start unit reception statistics, transmits the monitoring packet toward the destination determining unit, and counts up the packet transmission start unit transmission statistics, upon receiving the monitoring packet, the destination determining apparatus counts up the transfer reception statistics, transmits the monitoring packet toward the packet receiving processor, and counts up the transfer transmission statistics, the CPU acquires the transfer reception statistics and the transfer transmission statistics of the destination determining device, and stores these statistics in the memory, upon receiving the monitoring packet, the packet receiving processor counts up the packet receiving unit reception statistics, transmits the monitoring packet to the packet determining unit, and counts up the packet receiving unit transmission statistics, upon receiving the monitoring packet, the packet determining unit counts up the packet determining unit reception statistics and the health check reception number, when the packet determining unit does not receive the monitoring packet within a given time, the health check monitoring unit starts the health check result determining unit, the health check result determining unit compares the health check transmission number with the health check reception number, and if both of the numbers do not match each other, the health check result determining unit determines that the comparison result is abnormal, and starts the fault part specifying unit, and the fault part specifying unit determines a fault part corresponding to appropriate determination contents, according to the determination contents that predetermine what transmission number or transmission statistics is compared with what reception number or reception statistics in a determination sequence predetermined according to a transmission path of the monitoring packet to determine whether a determination result is matched or unmatched, and the fault parts corresponding to the determination contents, and displays fault information including the fault part in a display unit, or outputs the fault information to an output unit.

11. The fault detection method according to claim 9, the packet delay device further comprising:

a determination table that defines the contents that compare the transmission statistics from a first part with the reception statistics in a second part, or the contents that compares the transmission statistic from the first part with the reception statistics in the first part, according to a sequence of the path in which the monitoring packet is transmitted from the health check start unit, and received by the packet determining unit, as the determination contents, by a predetermined determination sequence, and defines the first part as the fault part when the determination contents are unmatched, and wherein the fault part specifying unit determines the fault part with reference to the determination table.

12. The fault detection method according to claim 9, further comprising:
a timer unit that starts the health check start unit every predetermined check interval, and determines a transmission interval of the monitoring packet.

13. The fault detection method according to claim 9,
wherein the monitoring packet includes a return necessity flag as a return setting, and a monitoring packet flag set as the monitoring packet,
the transfer determining unit returns the received packet as the monitoring packet if the return necessity flag is the return setting, while the transfer determining unit transfers the received packet to destination if the return necessity flag is no return setting, and
the packet determining unit determines that the monitoring packet is received if the monitoring packet flag is set to the monitoring packet setting.

14. The fault detection method according to claim 9, the packet delay device further comprising:
a first hardware part that includes first reception statistics that count up the reception number of the monitoring packet and first transmission statistics that count up the transmission number of the monitoring packet, receives the monitoring packet from the packet transmission start unit, and transmits the monitoring packet to the destination determining unit, wherein
the packet transmission start unit transmits the monitoring packet to the first hardware part,
upon receiving the monitoring packet, the first hardware part counts up the first reception statistics, transmits the monitoring packet to the destination determining unit, and counts up the first transmission statistics, and
the fault part specifying unit can determine the fault part with reference to the first reception statistics and the first transmission statistics.

15. The fault detection method according to claim 9, the packet delay device further comprising:
a second hardware part that includes second reception statistics that count up the reception number of the monitoring packet and second transmission statistics that count up the transmission number of the monitoring packet, receives the monitoring packet from the destination determining unit, and transmits the monitoring packet to the packet receiving processor,
wherein
the destination determining unit transmits the monitoring packet to the second hardware part,
upon receiving the monitoring packet, the second hardware part counts up the second reception statistics, the second hardware part transmits the monitoring packet to the packet receiving processor, and the second hardware part counts up the second transmission statistics, and
the fault part specifying unit can determine the fault part with reference to the second reception statistics and the second transmission statistics.

* * * * *